United States Patent [19]
Smiga et al.

[11] Patent Number: 6,029,171
[45] Date of Patent: Feb. 22, 2000

[54] METHOD AND APPARATUS FOR GROUP ACTION PROCESSING BETWEEN USERS OF A COLLABORATION SYSTEM

[75] Inventors: Brian Smiga, San Francisco; Dennis Buchheim, Palo Alto, both of Calif.; Thomas Hagan, Boston, Mass.; David Wadhwani, San Francisco; Norman Scott Storkel, Palo Alto, both of Calif.

[73] Assignee: Actioneer, Inc., San Francisco, Calif.

[21] Appl. No.: 08/798,522

[22] Filed: Feb. 10, 1997

[51] Int. Cl.$^7$ .................................................. G06F 17/00
[52] U.S. Cl. .......................... 707/102; 707/530; 707/517; 707/3
[58] Field of Search ............... 707/1–540; 395/671–684; 709/106–304

[56] References Cited

U.S. PATENT DOCUMENTS

| | | | |
|---|---|---|---|
| 4,989,132 | 1/1991 | Mellender et al. | 707/103 |
| 5,369,570 | 11/1994 | Parad | 709/226 |
| 5,390,281 | 2/1995 | Luciw et al. | 395/12 |
| 5,428,782 | 6/1995 | White | 709/106 |
| 5,446,842 | 8/1995 | Schaeffer et al. | 395/200.01 |
| 5,477,447 | 12/1995 | Luciw et al. | 364/419.08 |
| 5,530,852 | 6/1996 | Meske et al. | 707/501 |
| 5,552,995 | 9/1996 | Sebastian | 364/468.03 |
| 5,621,903 | 4/1997 | Luciw et al. | 395/326 |
| 5,644,735 | 7/1997 | Luciw et al. | 395/338 |
| 5,671,414 | 9/1997 | Nicolet | 395/684 |
| 5,745,889 | 4/1998 | Burrows | 707/2 |
| 5,749,079 | 5/1998 | Yong et al. | 707/100 |
| 5,832,275 | 11/1998 | Olds et al. | 707/203 |

OTHER PUBLICATIONS

PCT/US98/02921 International Search Report, 5 pages.

*Primary Examiner*—Wayne Amsbury
*Assistant Examiner*—David Y. Jug
*Attorney, Agent, or Firm*—Blakely, Sokoloff, Taylor & Zafman LLP

[57] ABSTRACT

A natural language-based information organization and collaboration tool for a computer system is disclosed. The present invention includes an apparatus and method for processing text expressions in a computer system, the apparatus including: 1) an object database defining an information object with an associated keyword; 2) a user input device for receiving an input text expression; 3) a parsing device for identifying the keyword in the input text expression, the parsing device including functions for linking the input text expression to the information object based on the keyword identified in the input text expression; and 4) a user output device for displaying to the user the identity of the information object to which the input text expression was linked. The apparatus of the present invention further includes supplemental information in the object database which is related to the information object, the user ouptut device further including functions for displaying the supplemental information when a corresponding keyword is identified in the input text expression. The apparatus of the present invention further includes a method and apparatus for collaboration between users of a time and project management system.

24 Claims, 26 Drawing Sheets

OBJECT TYPE TABLE

| KEY | TYPE | DESCRIPTION |
|---|---|---|
| 0 | ENVELOPE | "CONTAINER" OF A KEYNOTE THAT IS BEING SENT |
| 1 | LIST ITEM | ACTUAL KEYNOTE BODY AND STATUS INFORMATION |
| 2 | PROJECT | ACTIONEER PROJECT |
| 3 | SIMPLE DATE | NON-RECURRING (DUE) DATE |
| 4 | RECURRING DATE | RECURRING (DUE) DATE |
| 5 | PERSON | INDIVIDUAL CONTACT |
| 6 | LIST | ACTIONEER ACTION OR MEMO LIST |
| 7 | DELEGATE | PERSON TO WHOM A COLLABORATIVE NOTE IS DELEGATED |
| 8 | FYI RECIPIENT | PERSON TO WHOM A NOTE IS SENT FOR INFORMATION PURPOSES ONLY |
| 9 | ATTACHED PROJECT | PROJECT ATTACHED TO A NOTE |
| 10 | ATTACHED PERSON | PERSON ATTACHED TO A NOTE |
| 11 | KEYWORD | WORD(S) USED BY THE ACTIONEER PARSER TO INTERPRET A NOTE'S TEXT |
| 12 | PHYSICAL ADDRESS | HOME, WORK, ETC. ADDRESS |
| 13 | EMAIL ADDRESS | INTERNET, EXCHANGE, ETC. EMAIL ADDRESS |
| 14 | PHONE NUMBER | HOME, WORK, ETC. PHONE NUMBER |
| 15 | EMAIL TO | EMAIL ADDRESS TO SEND A NOTE TO (DELEGATE) |
| 16 | EMAIL FYI | EMAIL ADDRESS TO SEND A NOTE AS A "CC" (FYI RECIPIENT) |
| 17 | ENVELOPE CREATOR | PERSON WHO ORIGINALLY CREATED A PARTICULAR ENVELOPE |
| 18 | ENVELOPE SENDER | PERSON WHO SENT A PARTICULAR ENVELOPE TO THE CURRENT RECIPIENT |

OBJECT TYPE TABLE

| KEY | TYPE | DESCRIPTION |
|---|---|---|
| 0 | ENVELOPE | "CONTAINER" OF A KEYNOTE THAT IS BEING SENT |
| 1 | LIST ITEM | ACTUAL KEYNOTE BODY AND STATUS INFORMATION |
| 2 | PROJECT | ACTIONEER PROJECT |
| 3 | SIMPLE DATE | NON-RECURRING (DUE) DATE |
| 4 | RECURRING DATE | RECURRING (DUE) DATE |
| 5 | PERSON | INDIVIDUAL CONTACT |
| 6 | LIST | ACTIONEER ACTION OR MEMO LIST |
| 7 | DELEGATE | PERSON TO WHOM A COLLABORATIVE NOTE IS DELEGATED |
| 8 | FYI RECIPIENT | PERSON TO WHOM A NOTE IS SENT FOR INFORMATION PURPOSES ONLY |
| 9 | ATTACHED PROJECT | PROJECT ATTACHED TO A NOTE |
| 10 | ATTACHED PERSON | PERSON ATTACHED TO A NOTE |
| 11 | KEYWORD | WORD(S) USED BY THE ACTIONEER PARSER TO INTERPRET A NOTE'S TEXT |
| 12 | PHYSICAL ADDRESS | HOME, WORK, ETC. ADDRESS |
| 13 | EMAIL ADDRESS | INTERNET, EXCHANGE, ETC. EMAIL ADDRESS |
| 14 | PHONE NUMBER | HOME, WORK, ETC. PHONE NUMBER |
| 15 | EMAIL TO | EMAIL ADDRESS TO SEND A NOTE TO (DELEGATE) |
| 16 | EMAIL FYI | EMAIL ADDRESS TO SEND A NOTE AS A "CC" (FYI RECIPIENT) |
| 17 | ENVELOPE CREATOR | PERSON WHO ORIGINALLY CREATED A PARTICULAR ENVELOPE |
| 18 | ENVELOPE SENDER | PERSON WHO SENT A PARTICULAR ENVELOPE TO THE CURRENT RECIPIENT |

FIG. 15

OBJECT ASSOCIATION TABLE

| TYPE | ASSOCIATED TABLE |
| --- | --- |
| ENVELOPE | ENVELOPES |
| LIST ITEM | LIST ITEMS |
| PROJECT | PROJECTS |
| SIMPLE DATE | SIMPLE DATES |
| RECURRING DATE | RECURRING DATES |
| PERSON | PEOPLE |
| LIST | LISTS |
| DELEGATE | PEOPLE |
| FYI RECIPIENT | PEOPLE |
| ATTACHED PROJECT | PROJECTS |
| ATTACHED PERSON | PEOPLE |
| KEYWORD | KEYWORDS |
| PHYSICAL ADDRESS | PHYSICAL ADDRESSES |
| EMAIL ADDRESS | EMAIL ADDRESSES |
| PHONE NUMBER | PHONE NUMBERS |
| EMAIL TO | EMAIL ADDRESSES |
| EMAIL FYI | EMAIL ADDRESSES |
| ENVELOPE CREATOR | PEOPLE |
| ENVELOPE SENDER | PEOPLE |

FIG. 16

PROJECTS (TYPE=2)

| KEY | NAME |
|---|---|
| 201 | PATENTS |

SIMPLE DATES (3)

| KEY | DATE |
|---|---|
| 202 | THU., 2/7/97 |

PEOPLE (5)

| KEY | NAME |
|---|---|
| 203 | BRIAN SMIGA |
| 204 | JIM SALTER |
| 205 | TOM HAGAN |
| 206 | DENNIS BUCHHEIM |

LISTS (6)

| KEY | NAME |
|---|---|
| 207 | CALLS |

KEYWORDS (11)

| KEY | KEYWORD |
|---|---|
| 208 | CALL |
| 209 | PATENT |

EMAIL ADDRESSES (13)

| KEY | ADDRESS |
|---|---|
| 210 | smiga@actioneer.com |
| 211 | hagan@actioneer.com |

LINKS

| KEY 1 | TYPE 1 | OBJECT DESCRIPTION 1 | KEY 2 | TYPE 2 | OBJECT DESCRIPTION 2 |
|---|---|---|---|---|---|
| 207 | 6 | "CALLS" LIST | 208 | 11 | "CALL" KEYWORD |
| 201 | 2 | "PATENTS" PROJECT | 209 | 11 | "PATENT" KEYWORD |
| 203 | 5 | "BRIAN SMIGA" PERSON | 210 | 13 | "smiga@actioneer.com" Email Address |
| 205 | 5 | "TOM HAGAN" PERSON | 211 | 13 | "hagan@actioneer.com" Email Address |

SAMPLE DATABASE

FIG. 17

SAMPLE LINK TABLE

| KEY 1 | TYPE 1 | OBJECT DESCRIPTION 1 | KEY 2 | TYPE 2 | OBJECT DESCRIPTION 2 |
|---|---|---|---|---|---|
| 212 | 0 | ENVELOPE | 213 | 1 | LIST ITEM (ACTUAL NOTE) |
| 212 | 0 | ENVELOPE | 206 | 17 | "Dennis Bucheim" ENVELOPE CREATOR |
| 212 | 0 | ENVELOPE | 206 | 18 | "Dennis Bucheim" ENVELOPE SENDER |
| 212 | 0 | ENVELOPE | 210 | 15 | "smiga@actioneer.com" Email TO |
| 212 | 0 | ENVELOPE | 211 | 16 | "Hagan@actioneer.com" Email FYI |
| 213 | 1 | LIST ITEM | 201 | 2 | "PATENTS" PROJECT |
| 213 | 1 | LIST ITEM | 202 | 3 | "2/7/97" SIMPLE DATE |
| 213 | 1 | LIST ITEM | 203 | 5 | "Brian Smiga" PERSON |
| 213 | 1 | LIST ITEM | 204 | 5 | "Jim Salter" PERSON |
| 213 | 1 | LIST ITEM | 207 | 6 | "Calls" LIST |
| 213 | 1 | LIST ITEM | 203 | 7 | "Brian Smiga" DELEGATE |
| 213 | 1 | LIST ITEM | 205 | 8 | "Tom Hagan" FYI |
| 213 | 1 | LIST ITEM | 201 | 9 | "PATENTS" ATTACHED PROJECT |
| 213 | 1 | LIST ITEM | 204 | 10 | "Jim Salter" ATTACHED PERSON |

FIG. 18

METHOD AND APPARATUS FOR GROUP ACTION PROCESSING BETWEEN USERS OF A COLLABORATION SYSTEM

FIELD OF THE INVENTION

The present invention relates to the organization and access to information stored in a computer system. More specifically, the present invention relates to the analysis of natural language input to produce structured information output and the processing of notes in a computer system. The present invention also relates to time and action/project management using a computer system. More specifically, the present invention relates to a method and apparatus for collaboration between two or more persons for time and project management.

DESCRIPTION OF RELATED ART

Many application programs exist in the prior art for organizing information in particular ways or for manipulating specific types of information. For example, word processing applications are specifically designed for manipulating text documents in a computer system. Similarly databases in the prior art provide means for structuring data in well defined ways. Further, calendaring systems provide a structured way for tracking events or actions required at specified dates and times. Although these prior art applications provide ways for organizing information in particular ways, it is often inconvenient to require a user to switch back and forth between application programs when updates of information are required. Moreover, these types of systems require a user to organize the information prior to entering data into the computer system. For example, the user must know to activate a calendaring program if an appointment or action date is to be entered. In separate actions, the user may also need to update lists or databases associated with the appointment or action for which a calendar entry was made. In many prior art systems, the user is required to spend time navigating around a user interface to link information to the desired lists or categories to which it pertains.

U.S. Pat. No. 5,115,504 entitled "Information Management System" describes a system for linking elements representing stored information in a database. The system comprises a link structure formed in a section of the database independent of the elements, a pointer in the link structure indicating the location of a first element, and a second pointer in the link structure indicating the location of a second element. The database contains items comprising textual data and a plurality of categories into which the items may be categorized such that each item may be linked to more than one category. The system automatically assigns an element in a database to a parent category if it has been assigned to a child category of the parent. The system also generally features a means for assigning an element in a database to one or more of a plurality of categories, the categories being hierarchically arranged. The system constructs views as screens of information organized into sections having categories and section heads and items presented one after another beneath a given section head of a category to which the item has been assigned. After entering an item, the user can make further assignments directly by moving to the columns of the view and entering an existing name of a sub-category under the column head. In this manner, a link structure is created.

Unfortunately, the system disclosed in U.S. Pat. No. 5,115,504 still requires a user to directly manipulate information categories on a display screen. Using this approach, a user is still required to organize the information in some fashion on entry of the data into the desired category. In many situations, it is inefficient and inconvenient for a user to pre-organize and explicitly store information in this fashion. Moreover, further efficiencies could be obtained if a user could provide input in a convenient free form or natural language representation. It would also improve prior art systems if a user could update an information item or action item easily, quickly and without losing the context in which he/she is currently engaged.

Another disadvantage of the prior art systems described above, is that they do not provide a mechanism for collaboration between users or between applications. Organizing one's own information is important, but actions/projects are often shared between two or more people. In other words, it is not sufficient to organize one's own To Do lists and calendars. The user should also be able to collaborate with other users to assign projects, accept project assignments, and inform others. Furthermore, an ability to notify others of the status of projects is advantageous.

One prior art method of allowing multiple users to work together includes using e-mail to send messages to others. Although this prior art application allows users to communicate regarding any topic, it is not linked to calendars, lists, or external databases maintained by the users. Thus, as an agreement evolves with each e-mail exchange, the user is often involved in updating everything associated with the project. It would further improve prior art systems if a user could update an action item easily, quickly and without losing the context in which he/she is currently engaged. Further, it would be an improvement over the prior art to provide a system whereby multiple users could collaborate and track action items between many participants and across many computer systems.

Another prior art method utilizes top down delegation. This allows a supervisor to delegate projects to subordinates. However, it does not allow negotiation or collaboration between users. Rather, it is rigidly hierarchical. Thus, this method is not useful for collaboration and negotiation between peers. Another disadvantage of such prior art systems is that they use a client-server system. That is, a server has to be provided as a repository of information regarding the collaboration process. Thus, only clients that are connected to the server can participate in the collaboration. This means that persons who are not linked to the same server can not participate in the collaborative environment.

It would be an improvement over the prior art to provide a system that allows collaboration between two or more users. Further, it would be an improvement over the prior art to provide a system whereby multiple users could collaborate and track action items between many participants and across many computer systems.

Thus, a better natural language information organization and collaboration tool is needed.

SUMMARY OF THE INVENTION

The present invention is a natural language based information organization and collaboration tool for a computer system. The present invention includes an apparatus and method for processing text expressions in a computer system, the apparatus including: 1) relational object database defining an information object with an associated keyword, project, list, contact, date/time event or enclosure; 2) a user input device for receiving an input text expression; 3) a parsing device for identifying the keyword in the input text expression, the parsing device including functions for linking the input text expression to the information object based on the keyword identified in the input text expression; and 4) a user ouptut device for displaying to the user the identity of the information object to which the input text expression was linked. The apparatus of the present invention further includes supplemental information in the object database which is related to the information object, and the user ouptut device further includes functions for displaying the supplemental information when a corresponding keyword is identified in the input text expression. The apparatus of the present invention further includes a method and apparatus for collaboration between users of a time and project management system.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 15–18 illustrate the organization of tables in the object database of the preferred embodiment.

DETAILED DESCRIPTION OF THE PREFERRED EMBODIMENT

The present invention is a natural language based information organization and collaboration tool for a computer system. In the following description, numerous specific details are set forth in order to provide a thorough understanding of the present invention. However, it will be apparent to one of ordinary skill in the art that these specific details need not be used to practice the present invention. In other circumstances, well-known structures, circuits, and interfaces have not been shown in detail in order to not obscure unnecessarily the present invention.

Figure 1:
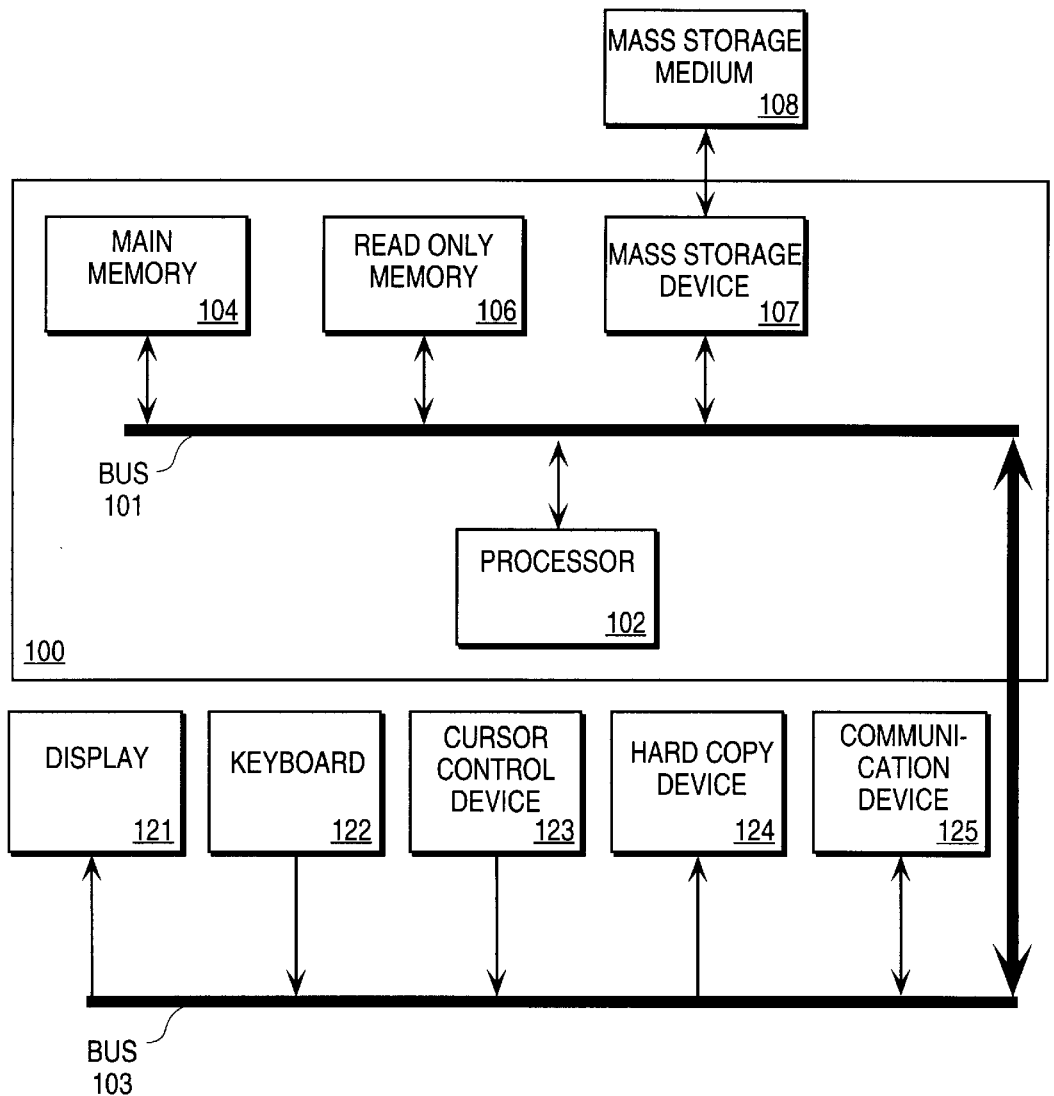
FIG. 1 illustrates a complete system on which the present invention may be implemented.

FIG. 1 illustrates a typical data processing system upon which one embodiment of the present invention is implemented. It will be apparent to those of ordinary skill in the art, however that other alternative systems of various system architectures may also be used. The data processing system illustrated in FIG. 1 includes a bus or other internal communication means 101 for communicating information, and a processor 102 coupled to the bus 101 for processing information. The system further comprises a random access memory (RAM) or other volatile storage device 104 (referred to as main memory), coupled to bus 101 for storing information and instructions to be executed by processor 102. Main memory 104 also may be used for storing temporary variables or other intermediate information during execution of instructions by processor 102. The system also comprises a read only memory (ROM) and/or static storage device 106 coupled to bus 101 for storing static information and instructions for processor 102, and a data storage device 107 such as a magnetic disk or optical disk and its corresponding disk drive. Data storage device 107 is coupled to bus 101 for storing information and instructions. The system may further be coupled to a display device 121, such as a cathode ray tube (CRT) or a liquid crystal display (LCD) coupled to bus 101 through bus 103 for displaying information to a computer user. An alphanumeric input device 122, including alphanumeric and other keys, may also be coupled to bus 101 through bus 103 for communicating information and command selections to processor 102. An additional user input device is cursor control device 123, such as a mouse, a trackball, stylus, or cursor direction keys coupled to bus 101 through bus 103 for communicating direction information and command selections to processor 102, and for controlling cursor movement on display device 121. Another device which may optionally be coupled to bus 101 thorough bus 103 is a hard copy device or printer 124 which may be used for printing instructions, data, or other information on a medium such as paper, film, or similar types of media. In the preferred embodiment, a communication device 125 is coupled to bus 101 through bus 103 for use in accessing other nodes of a distributed system via a network. The communication device 125 may include any of a number of commercially available networking peripheral devices such as those used for coupling to an Ethernet, token ring, Internet, or wide area network. Note that any or all of the components of this system illustrated in FIG. 1 and associated hardware may be used in various embodiments of the present invention; however, it will be appreciated by those of ordinary skill in the art that any configuration of the system may be used for various purposes according to the particular implementation. In one embodiment of the present invention, the data processing system illustrated in FIG. 1 is an IBM® compatible personal computer or a Sun® SPARC workstation. Processor 102 may be one of the 80×86 compatible microprocessors such as the 80486 or PENTIUM® brand microprocessors manufactured by INTEL® Corporation of Santa Clara, Calif.

The control logic or software implementing the present invention can be stored in main memory 104, mass storage device 107, or other storage medium locally accessible to processor 102. Other storage media may include floppy disks, memory cards, flash memory, or CD-ROM drives. It will be apparent to those of ordinary skill in the art that the methods and processes described herein can be implemented as software stored in main memory 104 or read only memory 106 and executed by processor 102. This control logic or software may also be resident on an article of manufacture comprising a computer readable medium 108 having computer readable program code embodied therein and being readable by the mass storage device 107 and for causing the processor 102 to operate in accordance with the methods and teachings herein.

The software of the present invention may also be embodied in a handheld or portable device containing a subset of the computer hardware components described above. For example, the handheld device may be configured to contain only the bus 101, the processor 102, and memory 104 and/or 106. The handheld device may also be configured to include a set of buttons or input signalling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention is a natural language based, parsable, always available, intelligent note editor that captures user thoughts, action requests, and information in a computer system. The present invention uses natural language parsing to identify keywords and date information amongst a free form text input expression (denoted keynote herein) entered by a user and establishes links to other information objects based on the identified words. These linked other objects include projects, contacts, date/time events, lists, and document identifier objects. Keywords are pre-defined one word or multiple word text strings with or without punctuation that are associated or linked to one or more related information objects. Lists are user-established collections of related keynotes. Lists can be action-related or merely archived memos. The present invention further classifies the text input (i.e., keynote) as a particular type of keynote, such as an action, a memo, a personal keynote, a shared keynote, an action request, an FYI (for your information) message, or one of several other different types of keynotes. A personal keynote is one not intended to be sent to anyone else. A shared keynote is sent to others. Once the keynote is classified, the present invention takes action upon the keynote by sending an action request to a linked contact, updating a linked list, contact, date/time expression, or project data, sharing the keynote to others in a collaboration group, or storing information related to the keynote in an organized and efficient manner. The present invention includes a real-time and interactive user interface for receiving input text expressions from a user and for providing selectable supplemental information to the user regarding the classification of the keynote. In addition, the present invention includes a parser for processing natural language in the manner described above.

Figure 2:
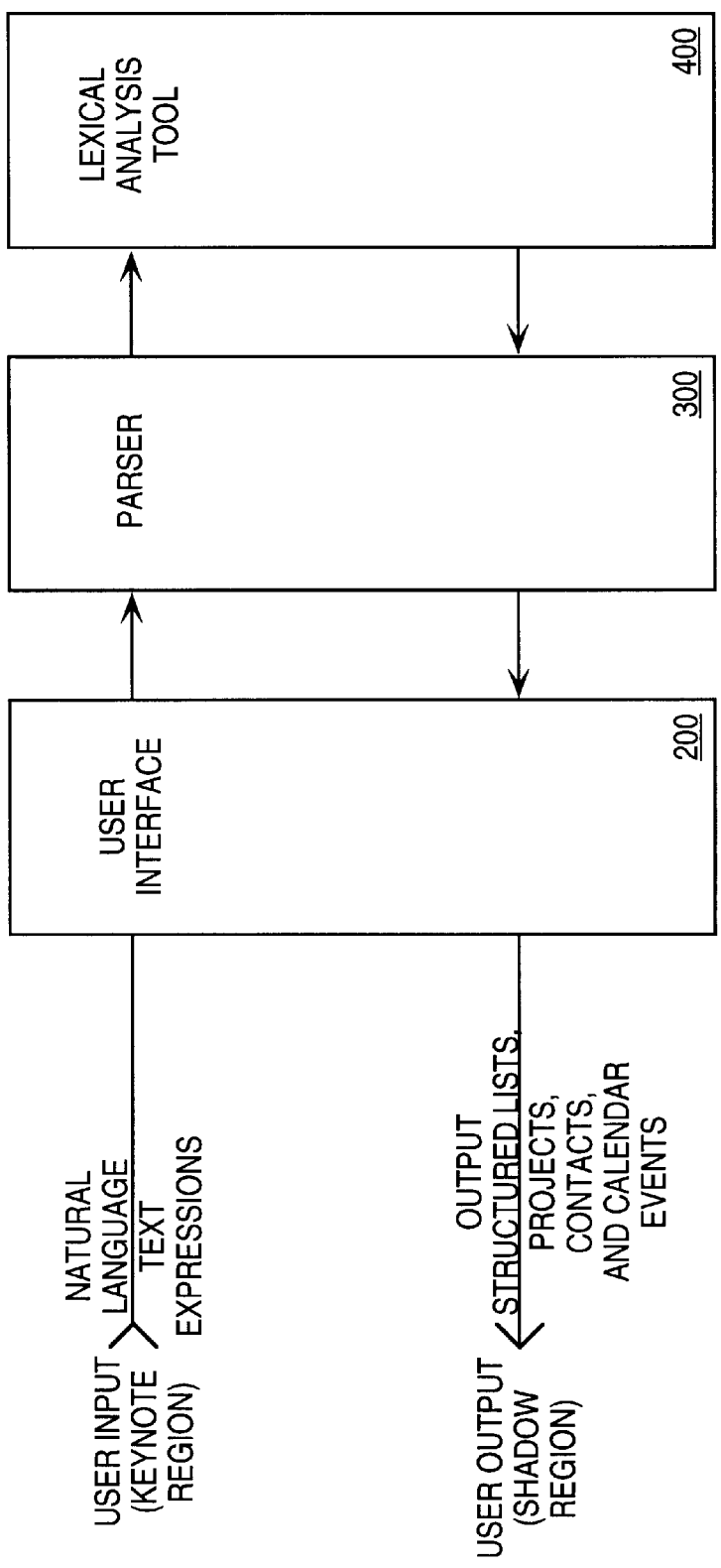
FIG. 2 is a block diagram of the main system elements of the present invention.

FIG. 2 illustrates in block diagram form the main components of the preferred embodiment of the present invention. A user provides natural language text expressions (i.e., keynotes) representing notes, thoughts, or action requests which are provided to user interface 200. User interface 200 passes these text expressions to parser 300. Parser 300 is responsible for identifying the type of keynote and for linking the keynote to one or more corresponding information objects based upon identified keywords or date/time expressions found in the input text expression. The linked objects include lists, projects, contacts, e-mail addresses, enclosed document identifiers, and date/time events for use in a calendar. Parser 300 uses lexical analysis tool 400 to partition the input text expression into a plurality of tokens. Tokens are sequential or adjacent portions of the input text expression between pre-specified delimiters. Once parser 300 has classified the keynote type and has linked the keynote to the associated objects, the linked list, project, contact, associated e-mail addresses enclosed document identifiers, and any calendar event, is passed back to user interface 200 and displayed by user interface 200 in a keynote and shadow region on display device 121.

Figure 3:
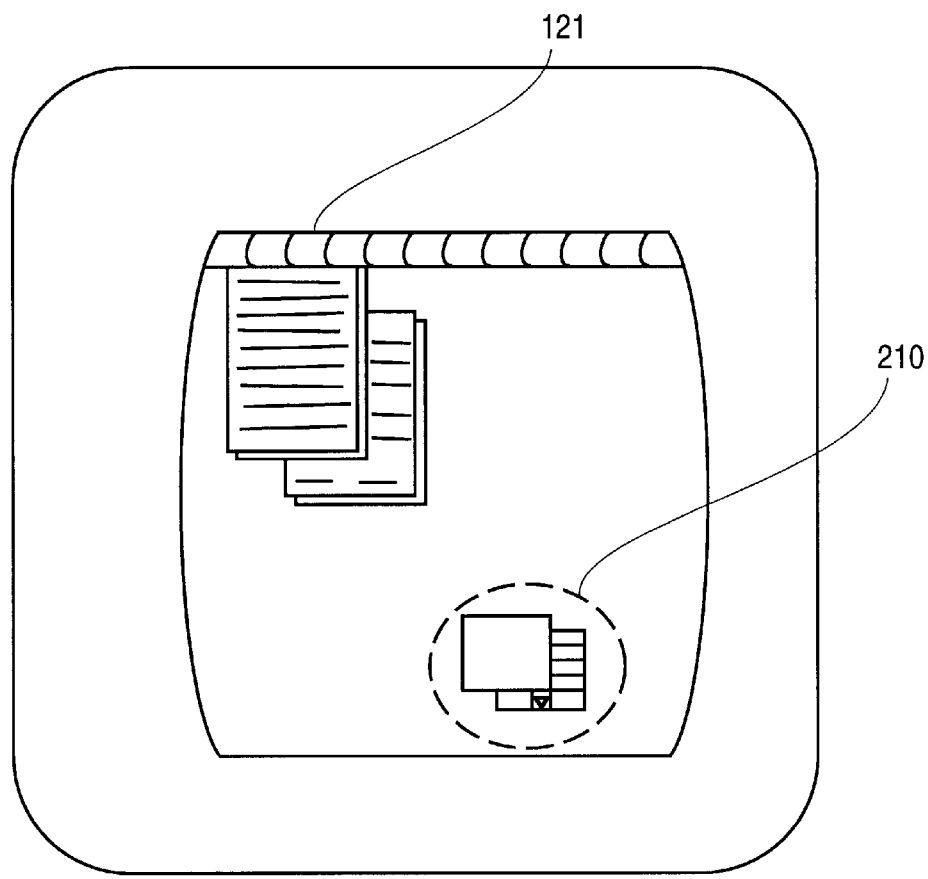
FIG. 3 illustrates a display screen showing the keynote and shadow regions.

Referring now to FIG. 3, an example of the keynote and shadow region 210 of user interface 200 is illustrated in relationship to the content of display device 121. In its typical application, the keynote and shadow region 210 of the present invention are displayed on display device 121 in combination with other windows or informational and functional regions of display device 121. The display of windows and informational or functional of regions on a display device is well-known to those of ordinary skill in the art. For example, the Windows 95™ operating system developed by Microsoft Corporation of Redmond, Wash. is an example of an operating system providing for the display of such windows. Keynote and shadow region 210 of the present invention may be displayed using the windowing and display functions provided by such an operating system. In the alternative, it will be apparent to those of ordinary skill in the art that other means for displaying such an informational area on a display device may equivalently be provided by other conventional operating systems or application programs. It will also be appreciated by those of ordinary skill in the art that the keynote and shadow region 210 may be displayed at any arbitrary position or at any arbitrary size using the conventional tools of the operating system. Moreover, conventional operating systems provide means for specifying a display priority or level with which the keynote and shadow region 210 may be specified and coded to always be displayed at the top most display priority or level. Thus, the keynote and shadow region 210 may be programmed to be always visible and always available on display screen 121 using conventional methods. In this manner, the present invention provides an always available method for entering textual information into a window or display region that provides real time feedback of parsing and keyword matching of the text entered.

Figure 4:
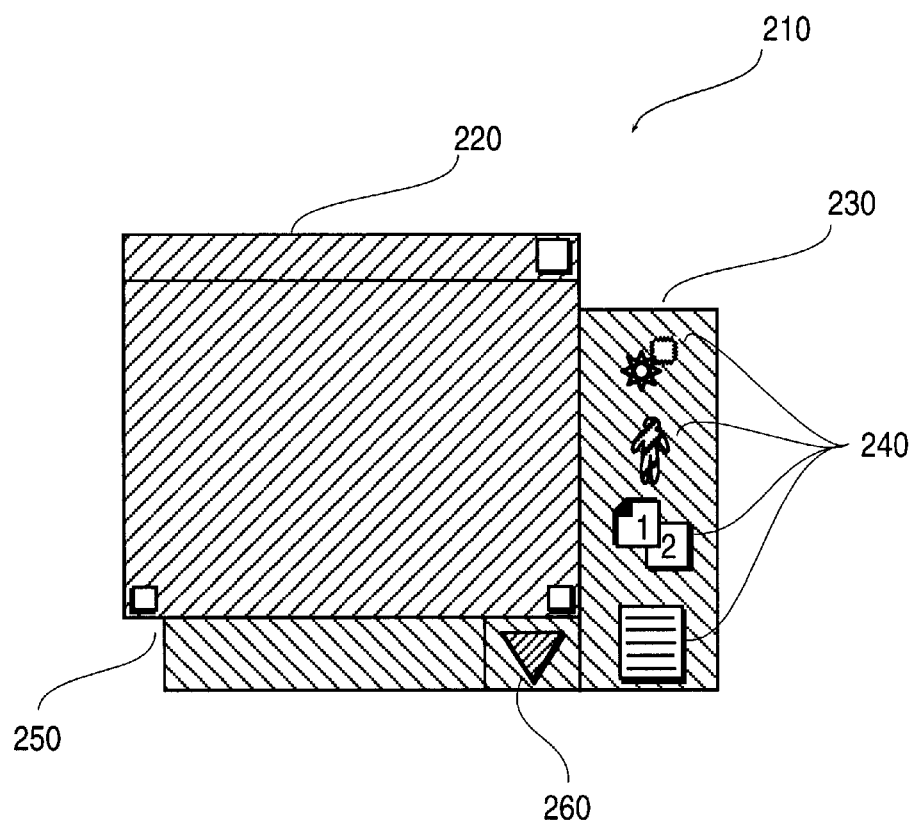
FIGS. 4, and 5–7 illustrate the operation of the user interface of the present invention.

Referring now to FIGS. 4A and 4B, examples illustrate the components comprising the keynote and shadow region 210 of the preferred embodiment. The keynote region 220 is an on screen computer version of a paper sticky note allowing the user to quickly capture information and ideas. The keynote region 220 provides a display area for the entry of a natural language text expression (i.e. keynote) representing textual information and ideas the user would like to capture. An example of such a keynote in keynote region 220 is shown in FIG. 4B. Any type of natural language text expression may be entered in keynote region 220. Conventional techniques may be used to display and word wrap the text in keynote region 220. Further, conventional techniques may be used for the selection or identification of keynote region 220 for the entry of text input. For example, the cursor control device 123, mouse, or special key codes entered on the key board 122 of the computer system may be used to select keynote region 220 for the entry of a text expression. As each key stroke is input to keynote region 220, the individual key stroke is transferred to user interface 200 and subsequently to parser 300 as will be described below in a later section of this document.

Referring again to FIGS. 4A and 4B, a shadow region 230 is provided to display the output of a parsed text expression and to capture input icon selections from the user. Shadow region 230 is a window that appears beneath, or alternatively adjacent to, the keynote region 220 and contains linked object information in data fields that are automatically set as a result of parsing the keynote entered into keynote region 220. Shadow 230 includes a set of icons 240 which are always visible along with keynote region 220 in the preferred embodiment. Icons 240 serve two purposes. First, icons 240 can be distinctively displayed in one of two states to represent the presence or absence of a link to a corresponding object as a result of parsing the keynote. For example, an icon of icons 240 representing a contact information object may be highlighted if contact information has been found as a result of parsing the keynote. Similarly, other icons corresponding to projects, lists, calendars, or enclosed documents may also be highlighted or unhighlighted depending on the presence or absence of links to objects, such as projects, lists, calendar events, or enclosed document information found as a result of parsing the keynote. Alternatively, the keywords of a keynote linked to a project, list, calendar event, or enclosed document object may be distinctively displayed in the keynote itself. For example, the keyword or keywords linking the keynote to a project object may be displayed in a first color or font type or style. The the keyword or keywords linking the keynote to a contact object may be displayed in a second color or font type or style. Similarly, other keywords linking the keynote to other objects may also be distinctively displayed to inform the user that the parser 300 has identified the corresponding keyword in the input text expression.

The second function served by the icons 240 and a related dropdown list control is a means for a user to select the display of the linked object type corresponding to a particular selected icon. The output produced by parser 300 is displayed in region 250 of shadow 230. Although shadow 230 may initially be displayed beneath keynote 220, the user may bring the shadow region 230 in front of the keynote region 220 by clicking on the shadow region 230 with the cursor control device 123 or by typing a pre-specified key entry on the keyboard 122. Alternatively, the shadow region 230 may also be selected for display using a menu command.

Figure 5:
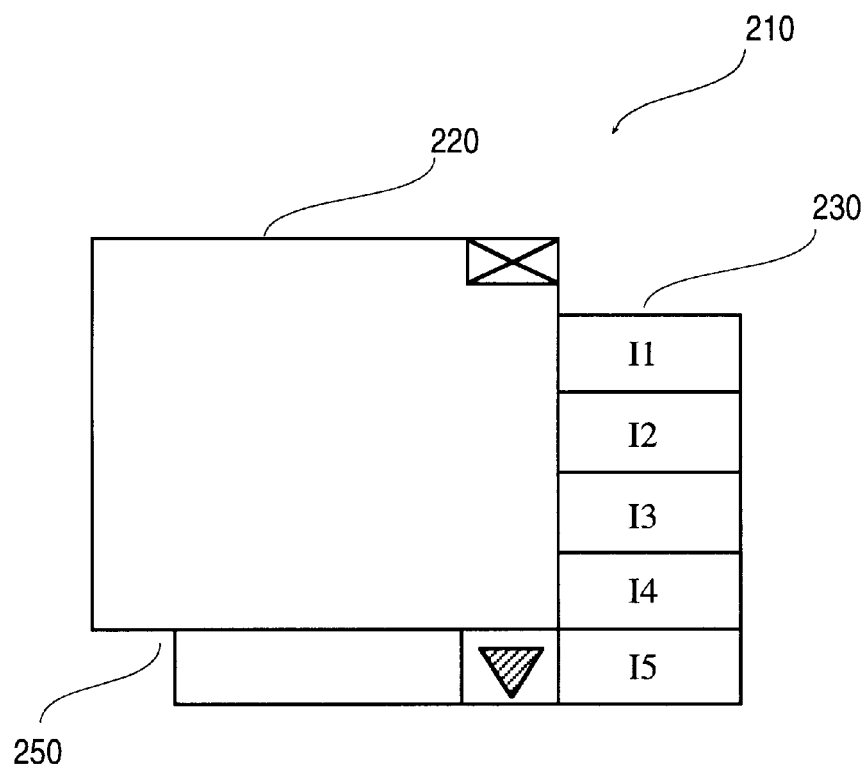

Referring now to FIG. 5, the generic version of the keynote and shadow region 210 of the preferred embodiment of the present invention is illustrated in its initial state. As shown, keynote 220 is initially blank prior to the entry of any keynote. Shadow region 230 includes a set of icons identified generically as I1 through I5. In this example, icon I1 represents a project object; icon I2 represents a contact object; icon I4 represents a date/time calendar object; icon I5 represents a list object. It will be apparent to one of ordinary skill in the art that other types of information or objects may correspond to each of the icons 240 of shadow 230. Similarly, it will be apparent to one of ordinary skill in the art that an arbitrary number of icons 240 may equivalently be provided in shadow region 230.

Figure 6:
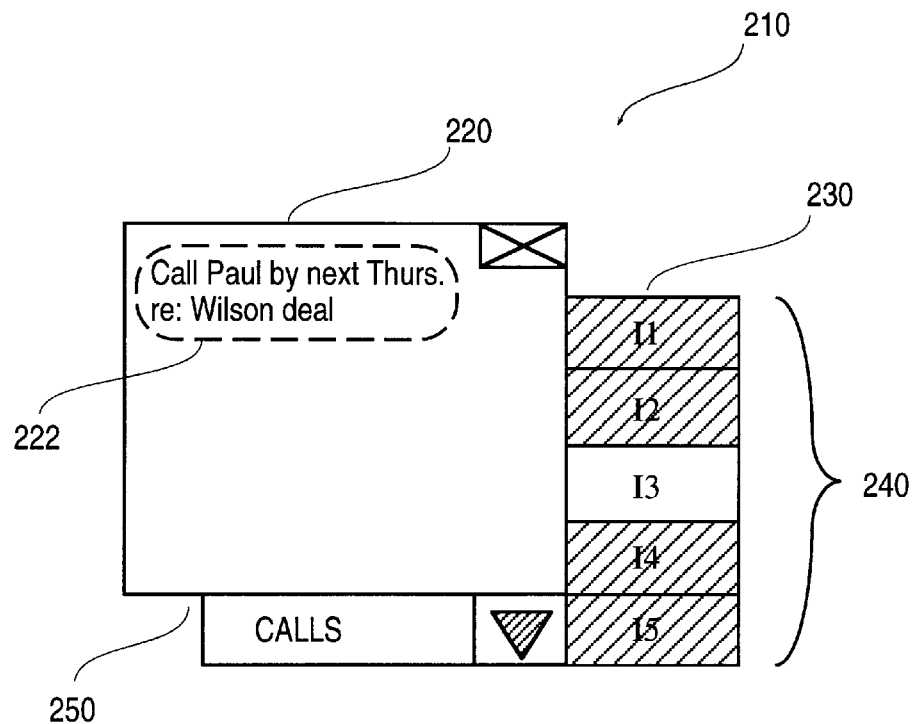

Referring now to FIG. 6, the keynote and shadow region 210 are shown after the entry of a keynote 222 indicated within a dotted circle region (for illustrative purposes only). It will be apparent to one of ordinary skill in the art that the dotted line is shown in FIG. 6 for illustrative purposes only and is not actually displayed in the preferred embodiment. As a result of parsing keynote 222, several output results have been produced by the present invention. First, the individual icons of icons 240 corresponding to object types linked by parser 300 to input keynote 222 are highlighted. For example, icon I1 is highlighted because parser 300 has linked a project object (i.e., "wilson deal") to keynote 222. Similarly, icon I2 is highlighted because parser 300 has linked a contact object (i.e. "Paul") to keynote 222. Icon I4 is highlighted because parser 300 has linked a date/time calendar event object ("next Thursday") to input keynote 222. Finally, icon I5 has been highlighted because parser 300 has linked a list ("Call") to input keynote 222. It will be apparent to one of ordinary skill in the art that if an information object type corresponding to a particular icon was not found by parser 300 in input keynote 222, the corresponding icon would not be highlighted in shadow region 230. A second result of the parsing of input keynote 222 by the present invention is classification of the keynote as one of several different keynote types, such as an action, memo, personal keynote, shared keynote, action request, FYI message, etc. Finally, the structured output information or linked object data is displayed in display area 250 of shadow 230. This output information is described in more detail in connection with FIG. 7.

Figure 7:
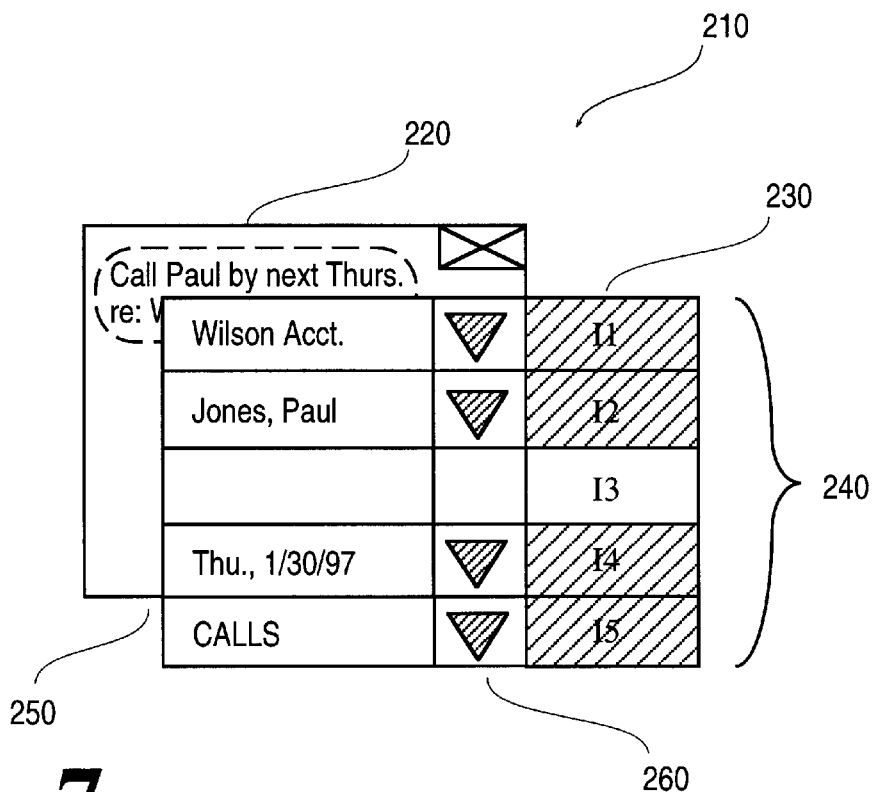

Referring now to FIG. 7, the keynote and shadow region 210 is illustrated after the shadow region 230 has been brought to the foreground using the cursor control device 123 or a pre-specified keyboard 122 entry. Region 250 of shadow 230 illustrates the structured information output produced as a result of parsing the sample input keynote 222 shown in FIG. 6. As a result of parsing input keynote 222, parser 300 has linked the reference to "wilson deal" in input keynote 222 to the previously specified "Wilson Account" project object. The linked project object "Wilson Account" is displayed in region 250 adjacent to corresponding icon I1. Similarly, parser 300 has linked the reference to "Paul" in input keynote 222 to the previously specified contact object "Paul Jones". The linked contact object "Paul Jones" is displayed in region 250 adjacent to its corresponding icon I2. The parser 300 has linked a date/time calendar event object as a result of parsing the "next Thursday" text in keynote 222. This processed time/date calendar event object is displayed in region 250 of shadow 230 adjacent to the corresponding icon I4. Finally, parser 300 has linked the keyword "call" in input keynote 222 to the previously specified "Calls" list previously defined as a list object. The identification of the linked Calls list is displayed in region 250 of shadow 230 adjacent to the corresponding icon I5.

Drop down list indicators 260 are provided to cause a list to expand downward so a multiple line list of objects or information is displayed in a drop down portion of region 250. Conventional methods exist for providing drop down list indicators on a computer display device.

Thus, user interface 200 and its corresponding keynote and shadow regions 210 provide a means and method for receiving a natural language text expression from a user and for concisely and efficiently displaying the parsed and linked structured output of the text expression in an area on display device 121. In the following sections, the detailed description of the processing performed by parser 300 and lexical analysis tool 400 is provided.

As can be seen from FIGS. 3–7 and the above description in connection with user interface 200 of the present invention, user interface 200 provides an easy and intuitive user interface for inputting text expressions and receiving resulting associated structured information. Further, because the keynote and shadow regions 210 are always displayed or easily displayable on display device 121, the user may easily record notes or thoughts within the keynote window 220 without losing the context of the work previously being done. In this manner, the present invention allows the easy recordation of notes without disrupting current user operations. In addition, the present invention allows notes to be recorded in a natural language unstructured form which more closely resembles the natural user thought processes. Thus, the user is not required to organize these notes or thoughts into particular structured fields and the user is not required to navigate through a multiple step application to record notes or thoughts. A further advantage of the present invention is the ability to integrate the operation of several conventional computer applications into a central free form user interface. Because the present invention provides a means for parsing natural language into structured information liked to project objects, contact objects, date/time calendar event objects, or list objects, the structured information thereby produced can be easily integrated to a word processor application, a calendaring application, a database application, a project management application, or an electronic mail application. The present invention thereby allows the user to input an unstructured text expression which can be parsed into structured information which is thereafter provided as input to this variety of conventional software applications.

Parser

The parser 300 of the preferred embodiment receives natural language text expressions from user interface 200 and produces structured information including links to information objects, such as projects, contacts, lists, date/time calendar items, and enclosed documents corresponding to those identified to keywords in the input text expression. Although many parsing algorithms exist in the prior art, the parser 300 of the present invention is unique in its ability to effectively identify and suggest keywords and/or date/time calendar events in an input text string and respond with interactive user real-time performance. Parser 300 of the preferred embodiment accomplishes these objectives with a novel internal architecture and set of methods for processing a natural language text expression. The architecture and methods used by the parser 300 of the present invention will be described in the following sections.

The present invention solves the problem of interpreting structure and meaning from natural language text. This meaning is a set of structured information related to or linked to other pertinent information known to and predefined by the user. The following example illustrates the operation of the present invention.

Suppose a user enters the following sample keynote to the user interface 200 of the present invention:

"call Scott tomorrow to arrange the next Engineering meeting." The parser 300 of the present invention is used to analyze this keynote in real-time as the user enters the keynote character by character. Note that the entire keynote is parsed after the entry of each new character. After the entire keynote is entered by the user and analyzed by parser 300, the following structured information output is produced by parser 300:

lists: Calls project: arrange Engineering meetings until Dennis gets back contact: Scott Jones date: tomorrow=current date+1 day In this example, parser 300 of the present invention recognized the keyword "call" in the input keynote and determined that this text input keyword should be linked to or related to the "Calls" list. The parser 300 of the present invention also recognized the keyword "Scott" and determined that this contact name should be linked to the contact object "Scott Jones". The word "tomorrow" was also recognized by parser 300, which calculated tomorrow's date (i.e., current date+1 day) and linked is date object to the input keynote. The keywords "Engineering meeting" were recognized by parser 300 as a link to the previously defined "arrange Engineering meetings until Dennis gets back" project object. Note that the present invention displays these links between the input keynote and corresponding linked object types in the data areas for the list, project, contact, or date/time calendar event objects in display region 250.

One important goal of the present invention is to ease the computer user's workload by anticipating his/her intentions based on the natural language text expression that has been entered. By anticipating the user's intentions with a reasonable degree of accuracy, the present invention allows the user to capture information in a much more efficient and comfortable manner. For example, after simply typing the input keynote in the example presented above: "call Scott tomorrow to arrange the next Engineering meeting", the user is not required to spend valuable time navigating around the display screen or an application user interface to link the input keynote to the desired list, project, contact, and date/time calendar event objects. The present invention automatically handles the linkage of the unstructured information in the input keynote to corresponding structured information objects. The user is thus able to save the keynote, send the keynote, or initiate action upon the keynote very quickly with very little user intervention.

Figure 8:
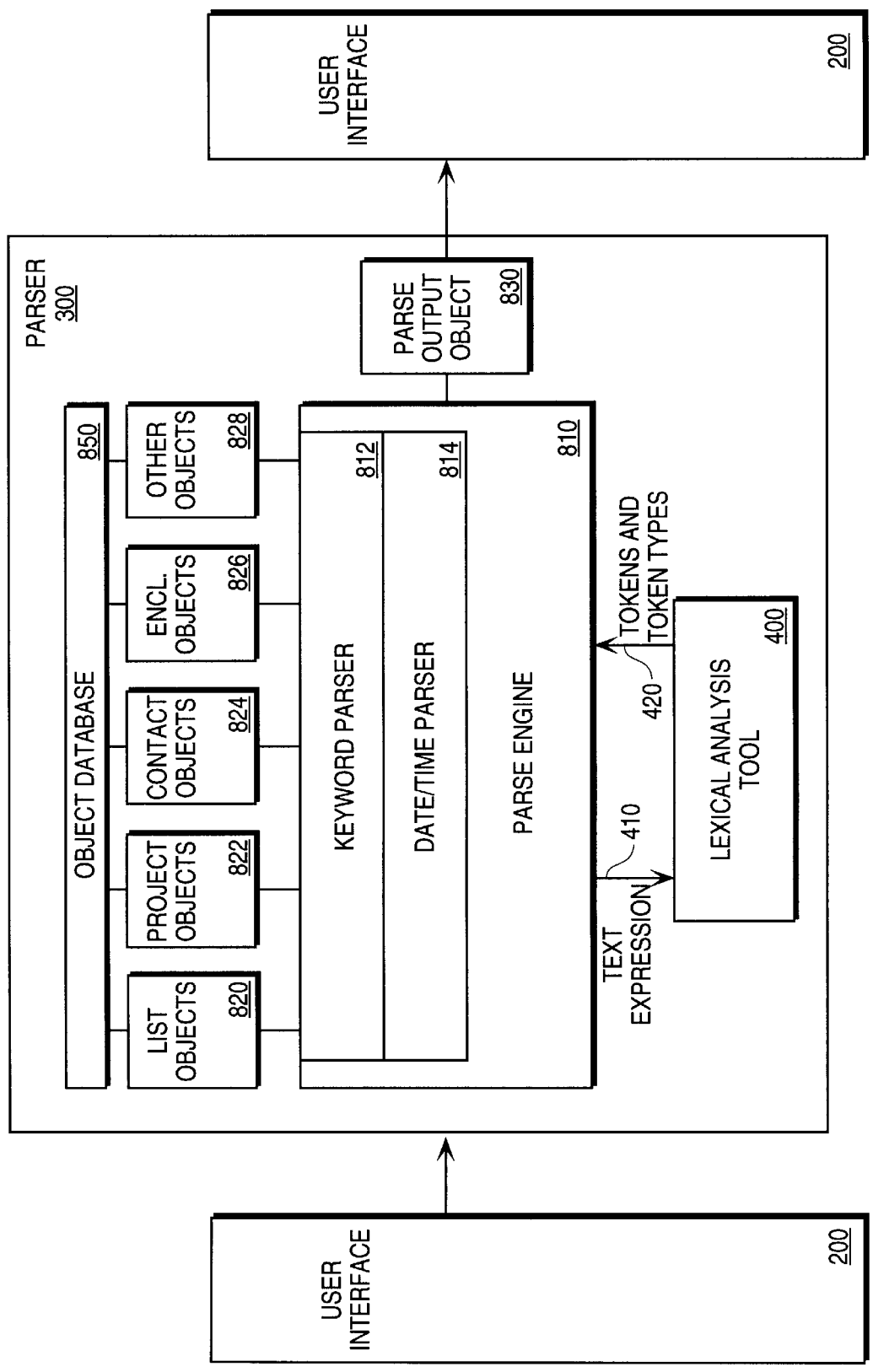
FIG. 8 is a block diagram of the components of the parser.

Referring now to FIG. 8, a block diagram illustrates internal components of parser 300 and its relationship to the user interface 200, lexical analysis tool 400, and object database 850. Parser 300 includes keyword and date/time parser 810 which receives the input natural language keynote from user interface 200. The keyword and date/time parser 810 includes a keyword parser and a date/time parser. The keyword parser of keyword and date/time parser 810 is responsible for parsing keywords from the input keynote. Keywords, can be linked to a variety of different object types including lists, project, contact, document enclosure objects and even dates (e.g., "Dave's Birthday"=6/25). Each of these different types of objects are maintained in parser 300. List object 820 is used to maintain user defined list objects. Project object 822 is used to maintain user defined project objects. Contact object 824 is used to maintain contact name objects. Enclosure object 826 is used to maintain enclosure or document identifier objects. Other subject types 828 may similarly be provided. For each type of object, the keyword parser of keyword and date/time parser 810 links objects 820 through 828 to corresponding keywords of the input keynote in a manner described in more detail below.

The date/time parser of keyword and date/time parser 810 is used to scan the input keynote for the presence of information corresponding to a date or time event. The operation of the date/time parser is described in more detail in a later section of this document.

Keyword and date/time parser 810 interfaces with a lexical analysis tool 400. It will be apparent to one of ordinary skill in art that the functions performed by lexical analysis tool 400 may equivalently be implemented as an integrated part of parser 300 or keyword and date/time parser 810. However, in the preferred embodiment of the present invention, lexical analysis tool 400 is provided as a software module independent from keyword and date/time parser 810. Upon receiving an input natural language keynote from user interface 200, keyword and date/time parser 810 passes this keynote to lexical analysis tool 400 on line 410. Lexical analysis tool 400 is responsible for producing a set of tokens from the input keynote.

Figure 9:
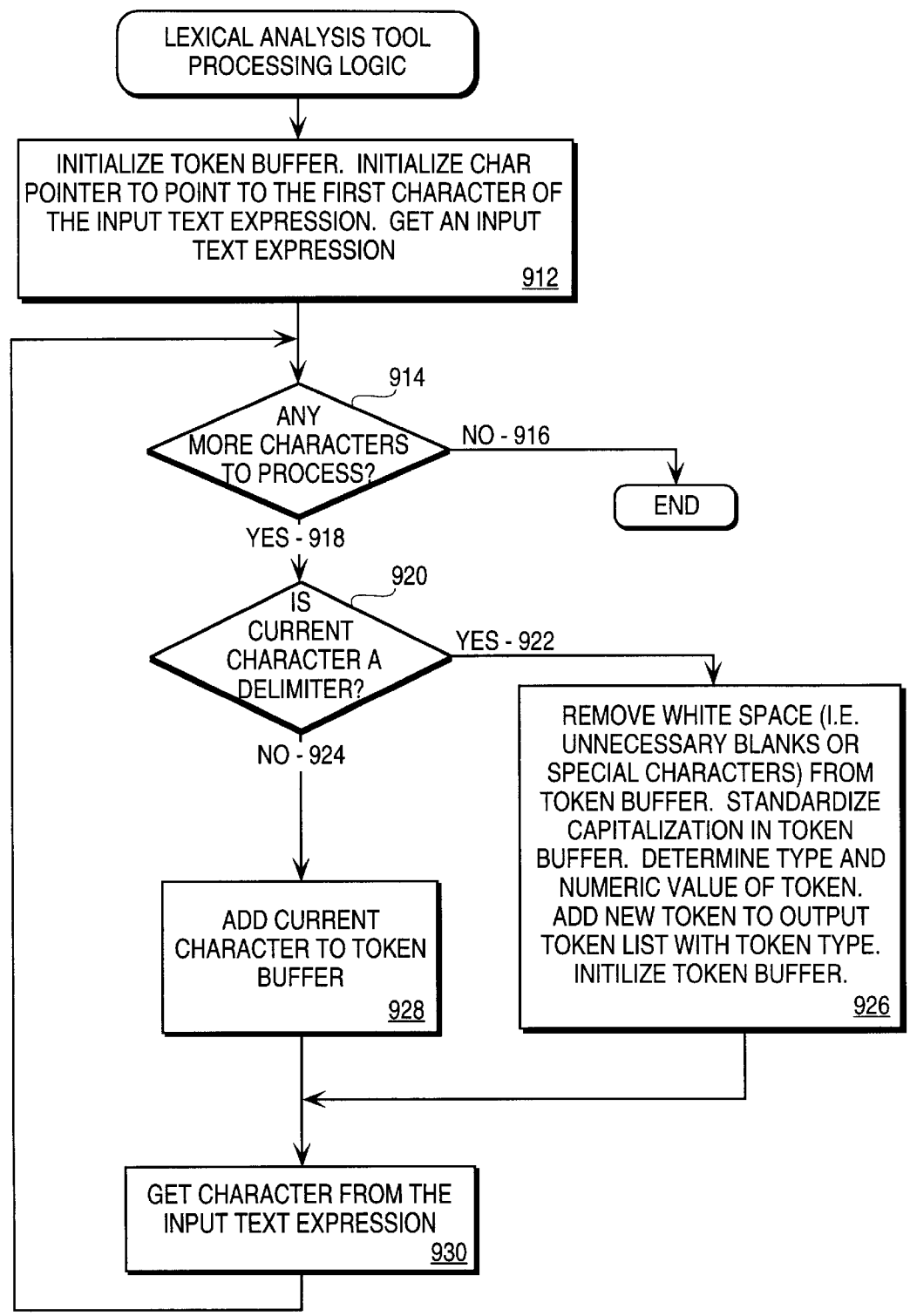
FIG. 9 is a flow diagram showing the processing flow of the lexical analysis tool.

Referring now to FIG. 9, a flowchart describes the processing performed by lexical analysis tool 400. In an initial processing block 912, lexical analysis tool 400 gets the input keynote from parser 300. As part of the initialization process, a character pointer is initialized to point to the first character of the keynote. A token buffer used for collecting characters of the current token is initialized in block 912. Next in decision block 914, a loop is started to process each of the characters in the input keynote. When the entire keynote has been processed, processing path 916 is taken and the lexical analysis tool 400 returns the output token list to parser 300. If more characters remain in the input keynote, processing path 918 is taken to decision block 920. If the current character being processed is not a delimiter character, processing path 924 is taken to processing block 928 where the current character is added to the token buffer and the next character is processed through block 930 and back to decision block 914. A delimiter character can be one of any pre-defined special characters such as blank, tab, comma, period, etc. Referring again to decision block 920 if the current character is a delimiter character, processing path 922 is taken to processing block 926 where processing is completed for the currently collected token. In block 926, any white space or unnecessary blanks surrounding the token are removed and any upper or lower case characters of the token may optionally be standardized to a consistent form of capitalization. Further, the token is classified as one of several token types such as alpha character, alpha numeral, date, date span, etc. A numerical quantity is also associated with the token. The token is also classified as a date/time token or a keyword token. In the preferred embodiment, two separate token lists are maintained: one for keyword tokens and another list for date/time tokens. This distinction is made because the parser 300 is context sensitive. For example, the token "Friday" may have special meaning to the date/time parser but not to the keyword parser. It will be apparent to those of ordinary skill in the art that the use of separate token lists is not necessary in alternative embodiments.

The new token, the token type, and token value information is then added to an output token list, which represents the token list that will be returned to parser 300 at the completion of processing performed by lexical analysis tool 400. Also in processing block 926, the token buffer is initialized to set up for collection of the next token and processing is transferred to processing block 930 where the next character in the keynote is processed. Using this basic processing flow performed by lexical analysis tool as shown in FIG. 9, the present invention converts a natural language free form input keynote to a set of tokens and token type and value information which can be conveniently processed by parser 300. The token list is transferred from lexical analysis tool 400 to parser 300 on path 420 as shown in FIG. 8.

The interface between parser 300 and lexical analysis tool 400 may also be used to exchange tokens between parser 300 and lexical analysis tool 400 for the purpose of obtaining a multiple word token that may be used to represent a particular date/time event. The parser 300 and lexical analysis tool 400 exchange date/time tokens until the parser 300 finds a date/time processing path that succeeds for the date/time token.

Figure 10:
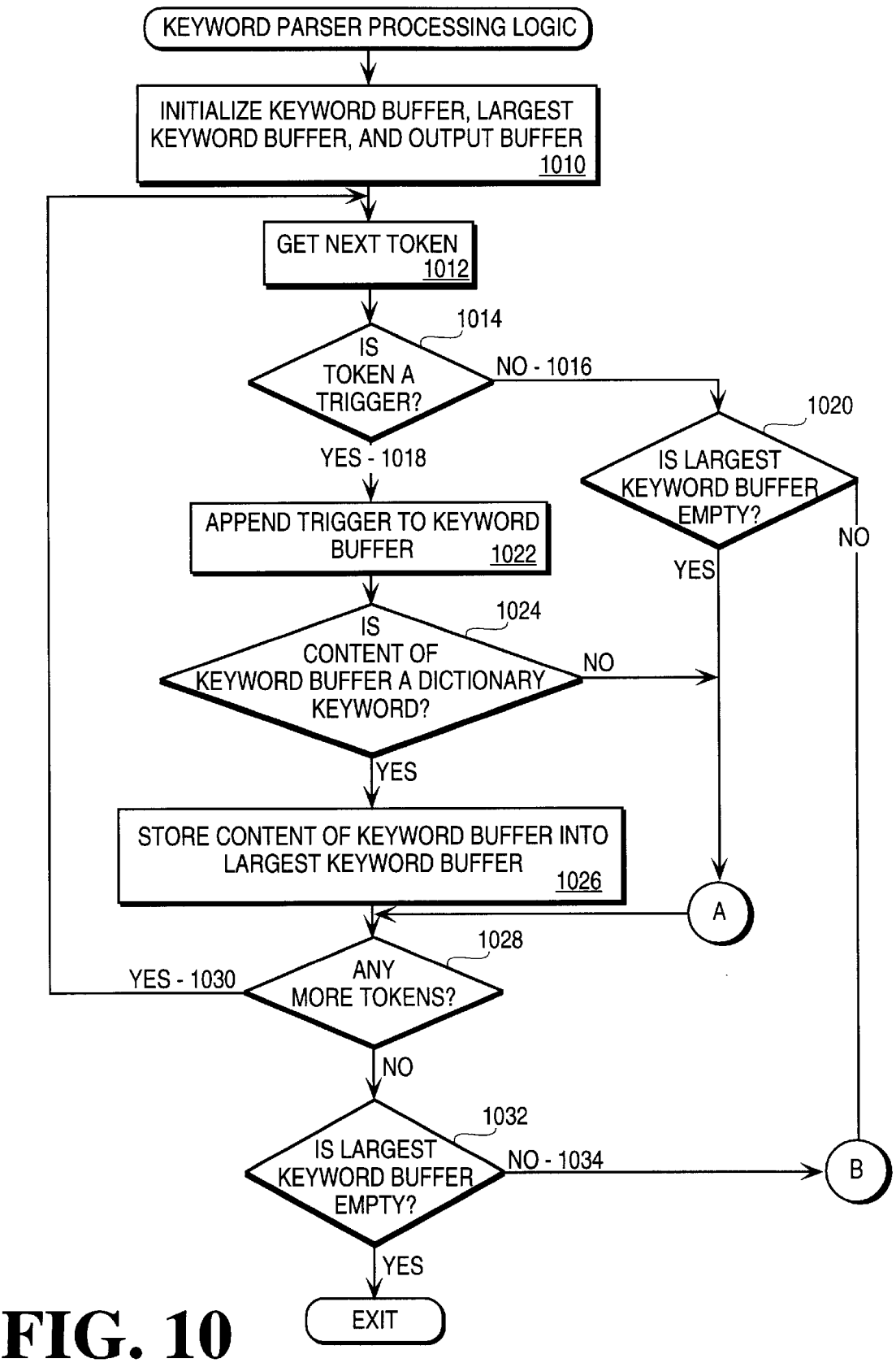
FIGS. 10–11 are flow diagrams showing the processing flow of the keyword parser.
Figure 11:
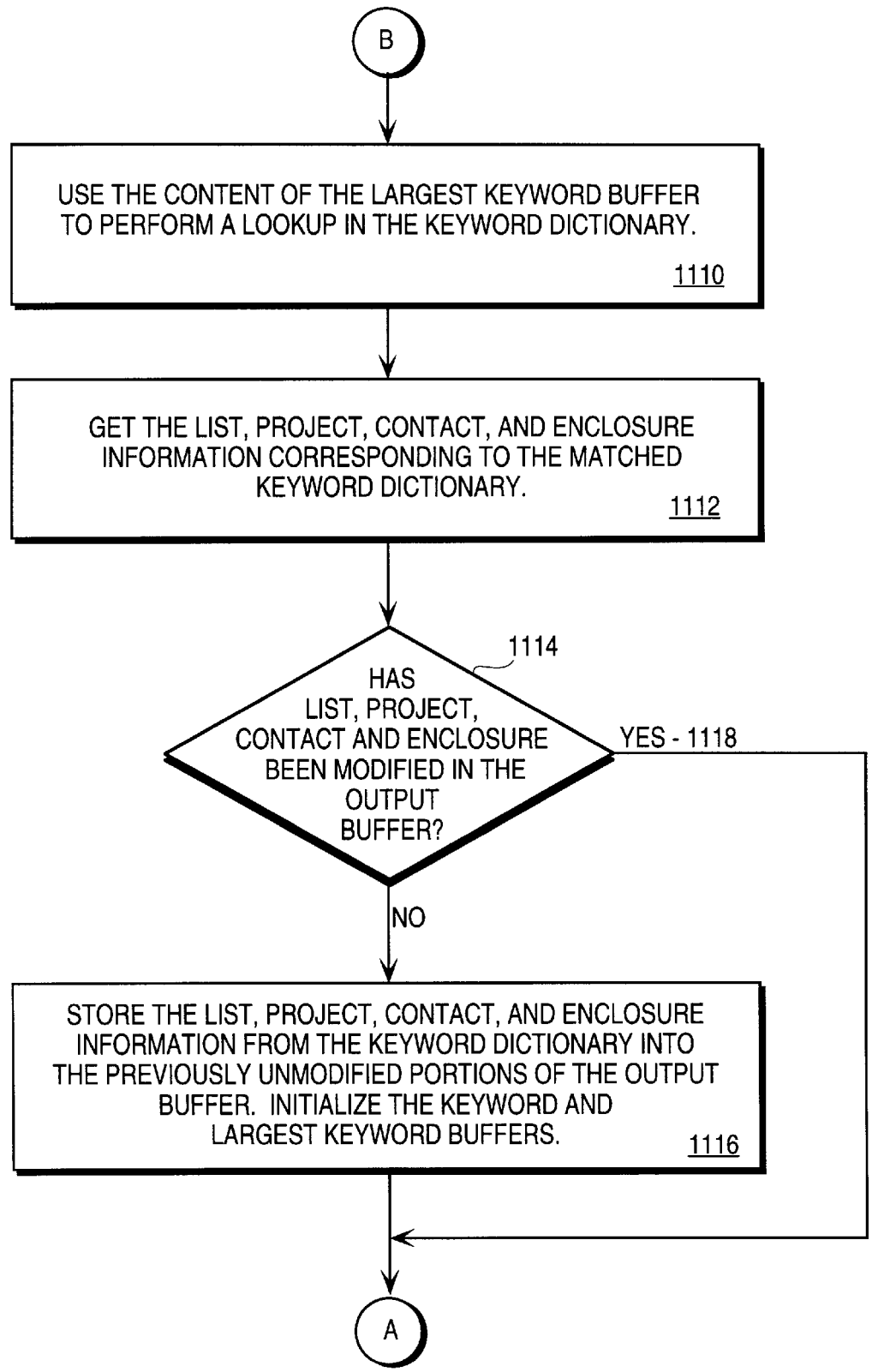
Figure 12:
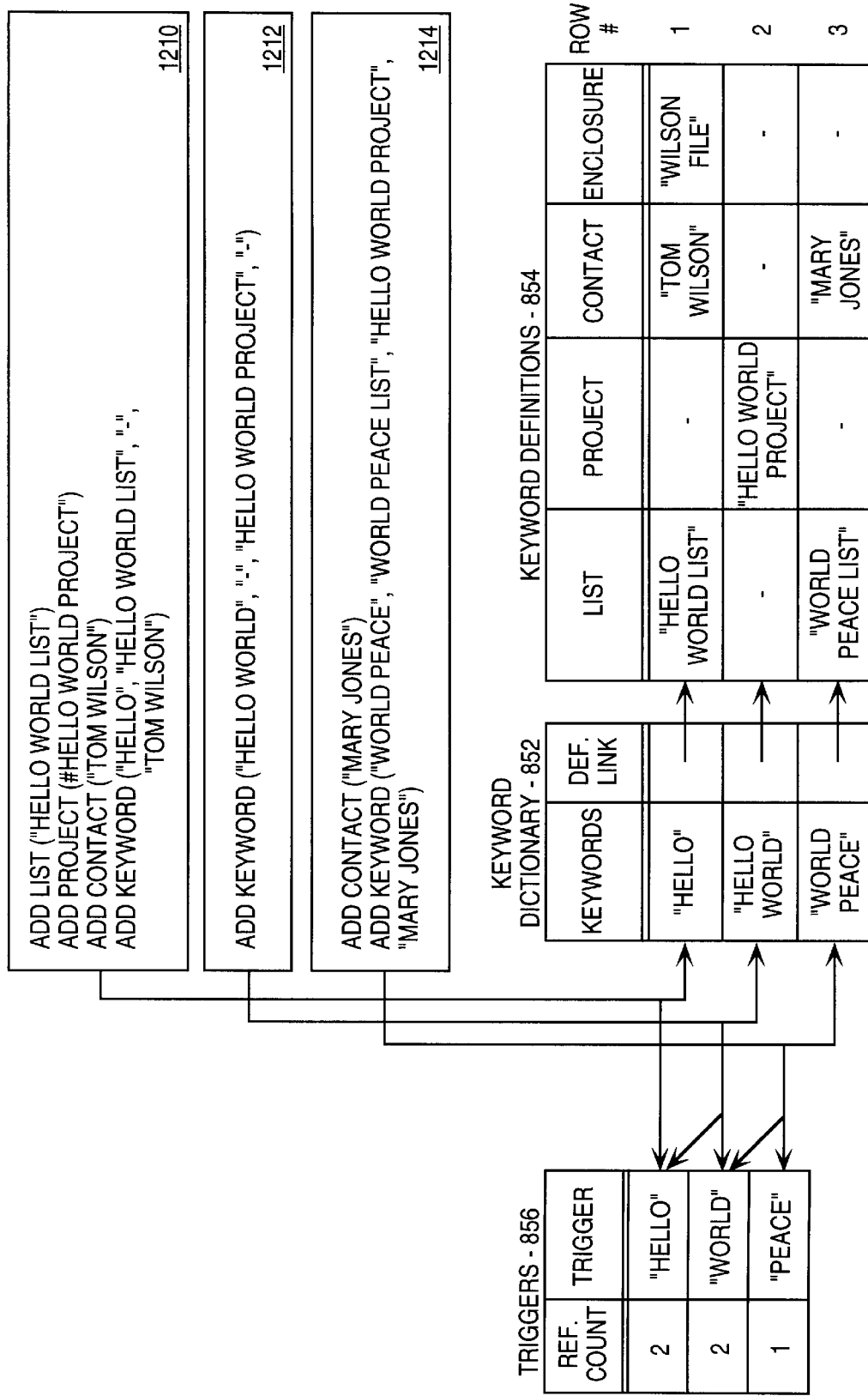
FIGS. 12–13 illustrate examples of the processing performed by the keyword parser.
Figure 13:
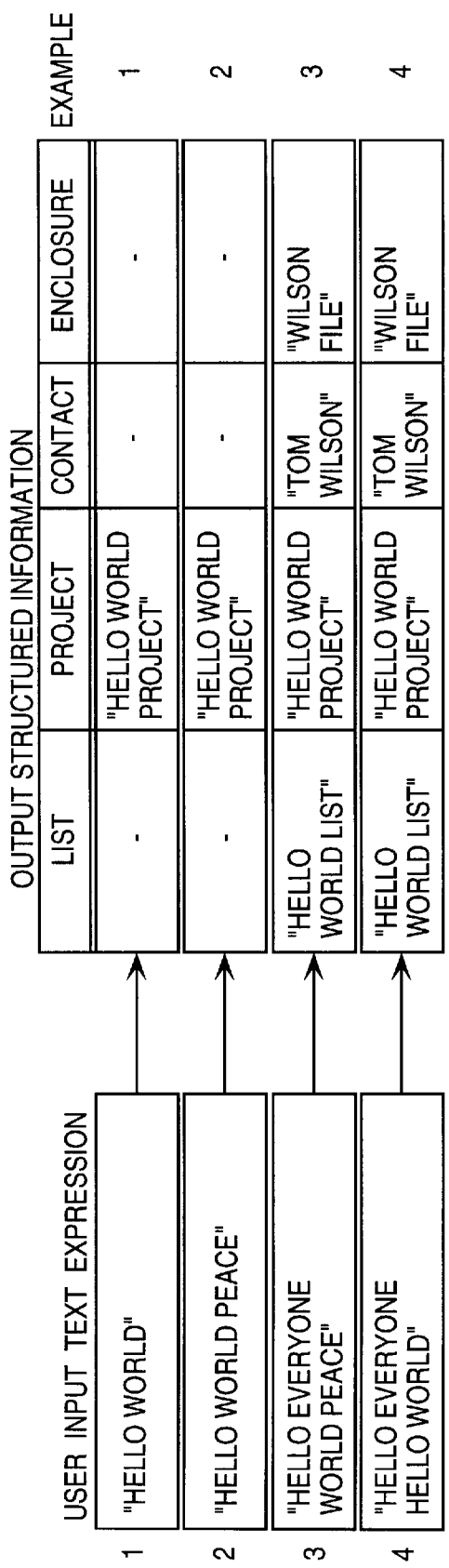

FIGS. 10–13 illustrate the operation of the keyword parser of keyword and date/time parser 810 of the present invention. FIGS. 10 and 11 are flowcharts illustrating the processing flow of the keyword parser of keyword and date/time parser 810. FIGS. 12 and 13 illustrate examples of the operation of the keyword parser of keyword and date/time parser 810.

Referring now to FIG. 12, examples illustrate the manner in which object dictionary 851 is initially loaded with keyword information. On initialization, the object database 850 is accessed to obtain the initial objects to be loaded into object dictionary 851. Because local data in the object dictionary 851 can be used, the operation of the parser 300 is much faster. More details on the object database 850 are provided in a later section of this document.

Object dictionary 851 includes a trigger table 856, a keyword dictionary 852, and keyword definitions table 854. Trigger table 856 includes entries called triggers for each of the tokens from which keywords are formulated. Associated with each trigger is a reference count identifying the number of keywords of which the corresponding trigger is a member. Keyword dictionary 852 includes the identity of each of the keywords pre-defined using methods or calls provided by the keyword parser of keyword and date/time parser 810. Blocks 1210, 1212, and 1214 shown in FIG. 12 illustrate three examples of calls to an "add keyword" function or method used to add an entry to keyword dictionary 852. These calls are also used to load keyword definition information into keyword definition table 854. As shown in the examples in FIG. 12, keyword definitions include a reference to a list object, a project object, and a contact object associated with each keyword in the keyword dictionary 852. The keyword dictionary 852 includes a definition link (Def. Link) which points to the keyword definition entry corresponding to the keyword in the keyword dictionary 852. As a result of the sample method calls 1210, 1212, and 1214 illustrated in FIG. 12, keyword dictionary 852, keyword definition table 854, and trigger table 856 are populated with keywords and associated keyword definitions and triggers. Once these tables and storage areas of object dictionary 851 are populated, the keyword parser of keyword and date/time parser 810 can be used to parse a user input keynote from a natural language form including these predefined keywords into an output structured information table containing the linked list objects, project objects, and contact objects associated to the keywords detected by the keyword parser of keyword and date/time parser 810 in the user input keynote.

Referring now to FIGS. 10 and 11, flowcharts illustrate the processing logic used by the keyword parser of keyword and date/time parser 810 for performing this function. In an initial processing block 1010, a keyword buffer, a current keyword buffer, and an output buffer are initialized. The keyword buffer is used to temporarily hold a portion of a keyword (Le., one or more tokens) until a most complete (i.e., longest) keyword can be built. The current keyword buffer is used for the storage of the currently most complete keyword. The output buffer is used for storage of the structured information or keyword definition information retrieved for the keywords of the current user input keynote. In processing block 1012 the next token in the user input keynote is retrieved. If the retrieved token is a trigger as determined by accessing the trigger table 856, the processing path 1018 is taken to processing block 1022 where the trigger is appended to the contents of the keyword buffer. Next, the keyword dictionary 852 is searched for the current contents of the keyword buffer in decision block 1024. If the contents of the keyword buffer are found in keyword dictionary 852, processing continues with processing block 1026 where the contents of the keyword buffer are stored in the current keyword buffer. In this situation, the current collection of tokens in the keyword buffer were found in keyword dictionary 852. If there are more tokens in the user input keynote, path 1030 is taken back to processing block 1012 where the next token is retrieved and the above process is repeated.

Referring again to decision block 1014, if the retrieved token is not a trigger as determined by access to trigger table 856, processing path 1016 is taken to decision block 1020 where the contents of the current keyword buffer are checked. If the current keyword buffer is empty, processing continues at decision block 1028 through the bubble labeled A. In this case, the current token is simply thrown away. If the current keyword buffer is not empty however, processing continues at the bubble labeled B illustrated in FIG. 11. Similarly, processing continues at the bubble labeled B if the current keyword buffer is not empty for the last token in the user input keynote resulting in traversal of processing path 1034.

Referring now to FIG. 11, processing continues for the keyword parser of keyword and date/time parser 810 at the bubble labeled B. In this situation, the current keyword buffer contains the greatest number of continuous tokens found in the user input keynote that form a predefined keyword in keyword dictionary 852. In this case, the current keyword in the current keyword buffer is used to perform a look up for the associated keyword in keyword dictionary 852 (processing block 1110). Once the keyword is found in keyword dictionary 852, the corresponding keyword definition from keyword definition table 854 is retrieved. The corresponding keyword definition includes the list, the project, and the contact object information corresponding to the matched keyword from the keyword dictionary (processing block 1112). In decision block 1114, a test is performed to determine if the keyword definition components (i.e., the list, the project, and the contact) have been previously modified in the output buffer. If this is true (processing path 1118), the current content of the output buffer is not further modified by execution of the operation in processing block 1116. In processing block 1116, the keyword definition information from the keyword dictionary is stored into the previously unmodified portions of the output buffer. In the present invention, if keywords or the tokens of a keyword are not mixed, and the keyword parser of keyword and date/time parser 810 detects two or more keywords that link to different keyword definitions, the keyword parser of keyword and date/time parser 810 of the preferred embodiment picks the keyword definition whose keyword appeared first or left-most in the user input keynote. Further, if two or more keywords or the tokens of the keywords are mixed together, the keyword parser of keyword and date/time parser 810 of the preferred embodiment picks the longest keyword from left to right in the user input keynote and then throws away all of the tokens of this longest keyword from further consideration in processing the remainder of the user input keynote. Using these parsing rules in the present invention, the resulting output structured information is predictable and understandable given an input keynote. Once the output buffer is loaded in processing block 1116, processing continues at the bubble labeled A illustrated in FIG. 10. Referring again to FIG. 10 and the bubble labeled A, the processing loop for processing tokens continues at decision block 1028 until all of the tokens in the input keynote are processed.

Referring now to FIG. 13, four examples (1–4) illustrate the operation of the preferred embodiment of the present invention given a user input keynote in association with the corresponding output structured information produced by the keyword parser of keyword and date/time parser 810 of the present invention. Further, the examples illustrated in FIG. 13 are based on the preloaded object dictionary 851 illustrated in FIG. 12. As described above in connection with FIG. 12, the object dictionary 851 including trigger table 856, keyword dictionary 852 and keyword definition table 854 is loaded with information such as the sample information illustrated in FIG. 12. Based on this information, the present invention produces the output structured information illustrated in FIG. 13 given the input keynotes shown for each example.

Referring now to FIGS. 12 and 13, in a first example, given the input keynote "hello world", the present invention matches this input keynote with the "hello world" keyword found at row 2 in keyword dictionary 852 shown in FIG. 12. As a result, the content of row 2 of keyword definition table 854 shown in FIG. 12 is transferred to the output structured information buffer shown in the first example in FIG. 13.

In the second example shown in FIG. 13, the input keynote "hello world peace" is parsed by the present invention. As a result, the present invention matches this second sample input keynote with the "hello world" keyword found at row 2 in keyword dictionary 852. In this case, the keyword definition at row 2 of keyword definition table 854 shown in FIG. 12 is transferred to the output structured information buffer as shown for the second example illustrated in FIG. 13. Note that the keyword "world peace" in the second example shown in FIG. 13 does not cause the keyword definition in the output structured information buffer to be modified.

Referring now to the third example illustrated in FIG. 13, the input keynote "hello everyone world peace" is processed by the keyword parser of keyword and date/time parser 810. In this case, the keyword parser of keyword and date/time parser 810 matches the "hello" keyword with the first row of keyword dictionary 852 shown in FIG. 12. In this case, the keyword definition at row 1 of keyword definition table 854 shown in FIG. 12 is transferred to the output structured information buffer shown for the third example illustrated in FIG. 13. In further parsing of the input keynote for the third example shown in FIG. 13, the keyword "world peace" is matched with the third row of keyword dictionary 852 shown in FIG. 12. However, because the list and contact components of keyword definition 854 have already been modified by the previously matched keyword ("hello"), the list and contact components in the output structured information are not further modified for the "world peace" keyword definition.

Referring to the fourth example illustrated in FIG. 13, the input keynote is parsed by the keyword parser of keyword and date/time parser 810. In this case, the keyword "hello" is matched to the first row of keyword dictionary 852 and the corresponding keyword definition from row 1 is transferred to the output structured information buffer as shown for the fourth example illustrated in FIG. 13. In this case, however, further parsing of the input keynote in the fourth example matches the keyword "hello world" to the second row of keyword dictionary 852. The corresponding keyword definition from row 2 is obtained. Because the project component of the keyword definition was not previously modified, the project definition for the second row of the keyword definition table 854 can be transferred to the project component of the output structured information buffer illustrated for the fourth example shown in FIG. 13.

The present invention includes methods and objects for suggesting new keywords to a user given a predefined object dictionary 851 and an input user keynote.

Figure 14:
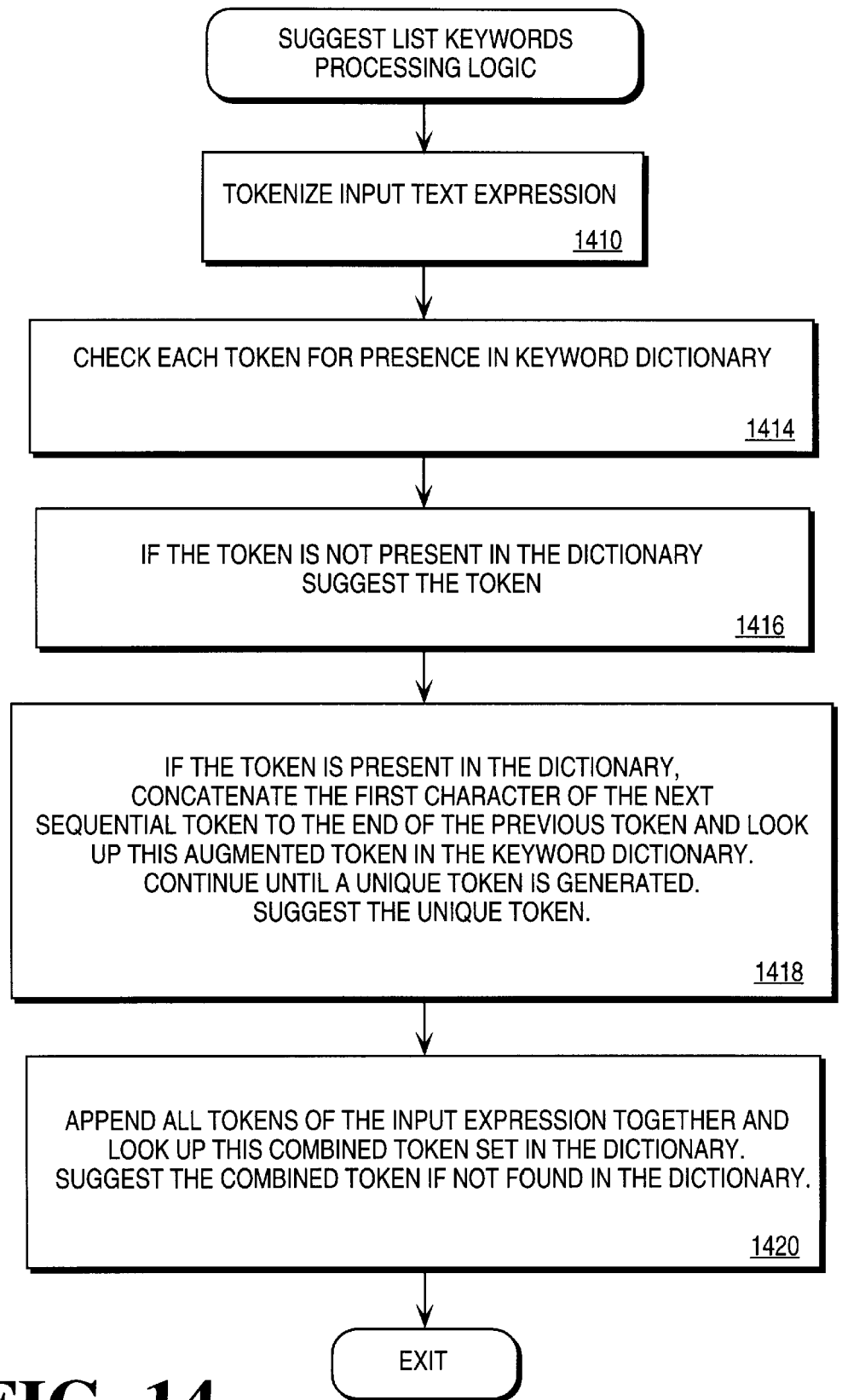
FIG. 14 is a flow diagram showing the processing flow of the suggest list keyword function.

Referring now to FIG. 14, a flowchart illustrates the processing performed for suggesting keywords to be linked to contact objects. It will be apparent to one of ordinary skill in the art that a similar set of processing may be performed for lists, projects, enclosures, or other keyword definition components. In processing block 1410, the user input keynote is parsed into tokens by lexical analysis tool 400. Each token can then be compared with the keyword dictionary 852 to determine if the token is already a predefined keyword (processing block 1414). In addition, the token may be checked with the content of a pre-defined list of words explicitly defined as not suggestible. If the token is not already in keyword dictionary 852 and the token is not on the list of non-suggestible words, the token may be suggested as a keyword in processing block 1416. If the token is already present in keyword dictionary 852 or the token is on the list of non-suggestible words, the token cannot be suggested. In this case, the token can be augmented in a variety of ways to render the token distinctly different from other keywords currently residing in keyword dictionary 852. As an example of such an augmentation of a token, the first character of the next sequential token in the input keynote may be used and concatenated with the token currently being processed. This augmented token may then be compared with the contents of keyword dictionary 852 to determine if the augmented token is not currently present in the keyword dictionary and not on the list of non-suggestible words. If the augmented token is found in keyword dictionary 852 or the augmented token is on the list of non-suggestible words, the augmented token may be further augmented using additional characters of the next token or the previous token in the input keynote. This process continues until a unique and suggestible augmented token is generated. This unique and suggestible augmented token may then be suggested as a keyword to the user in processing block 1418. Finally, all tokens in the input keynote may be appended together as a combined token. This combined token is compared with the contents of keyword dictionary 852 and the list of non-suggestible words to determine if the combined tokens are currently defined as a keyword in the keyword dictionary or as non-suggestible. If not, the combined tokens may be suggested as an additional keyword in processing block 1420.

In an alternative embodiment, the logic for suggesting keywords may employ different heuristics based on the type of object for which keywords are being suggested. Thus, for example as described above for contact objects, it may be desirable to augment a keyword to include characters from subsequent tokens or to create initials from multiple tokens as one may do for the name of a contact. However, this process may not be appropriate for creating augmented keywords for list or project objects. In these cases, a somewhat different augmentation process may be used. The use of different heuristics based on the type of object is easily implemented with the present invention because the type of object will be known at the time the suggesting process is employed. By knowing the type of object for which a keyword suggestion is being generated, the appropriate heuristic may be selected.

Thus, the processing performed by the present invention for parsing keywords is described.

Date/Time Parser

The implementation of the date/time parser of keyword and date/time parser 810 of the present invention is described in the following sections. The date/time parser of keyword and date/time parser 810 uses lexical analysis tool 400 to break an input keynote into date relevant tokens and to identify tokens in the input expression that may be relevant to date parsing. The lexical analysis tool 400 uses a method for breaking the input keynote into date relevant tokens similar to the method described above in connection with FIG. 9. In addition, lexical analysis tool 400 provides for each token a specification of the type of the token and a numerical value associated with the token. For example, the word "two" would be classified by lexical analysis tool 400 as a numerical type token with a value equal to 2. As another example, the token "Monday" would be classified by lexical analysis tool 400 as a day type token with a numerical value equal to 2, corresponding to the second day of the week. As another example, the token "/" would be classified as a date separator token with an undefined numerical value. In a similar manner, all other tokens associated with date or time events are similarly predefined with a specific type and a predefined numerical value which lexical analysis tool 400 provides as output to keyword and date/time parser 810 when the particular token is identified in the input keynote. Using the token and token type information provided by lexical analysis tool 400, the date/time parser of keyword and date/time parser 810 is able to parse and recognize date/time events in an input keynote.

The date/time parser of keyword and date/time parser 810 is responsible for parsing the input keynote to interpret dates and times from the natural language input keynotes as entered by a user. The goal of the day/time parser 814 of the present invention is to parse a set of date and time tokens from an input keynote and determine with perfect accuracy the intended date or time constraint applied by a user. The format used by the present invention is simple, short, intuitive, and powerful enough to allow a user to express almost any date/time value by typing a short and simple expression directly as natural language text rather than being forced to navigate through a maze of dialogs or to manipulate numerous command buttons, check boxes, or other graphical user interface components.

The date/time parsing performed by the date/time parser of keyword and date/time parser 810 uses a novel form of recursive descent with infinite look ahead technique. This technique provides an O(N) complexity methodology. Similarly, the keyword parser of keyword and date/time parser 810 achieves an O(N) complexity. This is the best complexity theoretically possible. Thus, the performance of the present invention is well suited for real-time applications requiring quick response.

The following is a list of date expressions recognized and a list of rules employed by the keyword and date/time parser 810 of the preferred embodiment:

Note: Assume today is Monday, June 10, 1996 while reading this table.

| Date Description | Parses to This Date |
|---|---|
| • today | Mon., 6/10/96 |
| • this morning/afternoon/evening | Rule: Parse to current date |
| • tonight | |
| • tonite | |
| • tomorrow | Tues., 6/11/96 |
| • tomorrow morning/afternoon/ evening/night | Rule: Parse to the current date +1 day |
| • [0]6/10 | Mon., 6/10/96 |
| • [0]6-10 | Rule: Parse to the current date or the nearest future occurrence of the specified date. |
| • [0]6.10 | |
| • June 10 | |
| • June 10th | |
| • June ten[th] | |
| • ten[th] of June | |
| • [0]6/10/98 | Wed., 6/10/98 |
| • [0]6-10-98 | Rule: Parse to the specified date. |
| • [0]6.10.98 | Note: The parser must be |

-continued

Note: Assume today is Monday, June 10, 1996 while reading this table.

| Date Description | Parses to This Date |
|---|---|
| | configured for European locations to enable handling of the DD/MM/YY date format. |
| • June 10, 1998 | |
| • 10 June 1998 | |
| • two days* from today** | Wed., 6/12/96 Rule: Parse to the Specified starting date ("today," etc.) + specified increment ("two days," etc.). |
| • in/within fourteen days* | Mon., 6/24/96 Rule: Parse to the current date + specified number of days or weeks. Adding months will yield the same day of the month (if possible), x months later. In other words, "2 months from "june 4th, 96" will yield "August 4th, 96". "one month from May 31st", will yield "June 30th" (the last day of the month, since June 31st does not exist). Similarly, "five years from 5/5/94 "will yield "5/5/99". |
| • Monday | Mon., 6/17/96 |
| • this Monday | Rule: Parse to the next occurrence of the specified day; never the current date. For example, Tuesday" is Tue, 6/11/96. |
| • this coming Monday | |
| • next Monday | Mon, 6/17/96 Rule: Parse to: 1. "next <day>" is specified during the next week, using Monday as the first day of the week. 2. "On a Sunday, "next <day>" parses to the specified day during the 2nd week following the Sunday (i.e., the week beginning eight days from the Sunday) - except for Sunday, which parses to the Sunday that is one week away. |
| • first*** Monday of next month | Mon., 7/3/96 |
| • first*** Monday of/in July | Rule: Parse to the first occurrence of the specified day during the next month on the calendar. |
| • first*** Monday of June, 1995 | |
| • first*** Monday of June, 95 | |
| • first*** Monday of 6/95 | |

* Could specify "weeks," "months," "years," "Mondays," "Tuesdays," etc. instead of "days"
** Could specify "tomorrow," "next Thursday," etc. instead of "today"
*** Could specify "second", "third", "fourth", "fifth", and "last".

Recurring events can occur on a daily, weekly, monthly, annual basis. The keyword and date/time parser 810 also handles the entry of recurring events. The keyword and date/time parser 810 recognizes the following types of recurring event specifications and associated date-related keywords or key expressions. Note that other forms may similarly be handled.

every day*
every other day*
every three days*
every Thursday
every weekday (every Monday, Tuesday, Wednesday, Thursday, and Friday)
every weekend (every Saturday & Sunday)
every other weekend
every other Thursday
Tuesdays (every Tuesday)
weekdays (every weekday)
first Thursday of every [other] month
first Thursday of every three months
fifteenth of every month

* "day(s)" can be replaced by "week(s)", "month(s)", and "year(s)".

Note that recurring dates are assumed to occur forever in the preferred embodiment. The keyword and date/time parser 810 always picks an intelligent starting date, but does not report an ending date. For example, assuming that today is Monday, 6/11/96, "every Tuesday" will be interpreted by the parser 810 as "every Tuesday" starting Tuesday, 6/12/96 (the nearest weekday starting from today).

As with dates, abbreviations and numerical/ordinal substitutions are correctly interpreted.

DLL Interface of the Preferred Embodiment of the Present Invention

The following section describes the interface to the parser 300 dynamic link library (DLL) component of the preferred embodiment of the present invention. The generic use of DLL's is well known to those of ordinary skill in the art.

The parser 300 of the preferred embodiment is composed of a single DLL. In this embodiment, the DLL is written in the C++ programming language. It will be apparent to those of ordinary skill in the art that other programming languages, such as C, Basic, etc., may alternatively be used. The parser 300 capabilities of the preferred embodiment include the following:

Date and time parsing.
Recurring event parsing.
List, project, and contact parsing via keywords.
Suggestions of list, project, and contact keywords.
Automatic Completion (auto-complete or auto-fill) of list, project, and contact names. This process is similar to a conventional "quick fill" technique designed to assist the user by completing the partial entry of data based on previously entered data.
Collaboration parsing.

From the point of view of parser 300, date and time parsing requires no special knowledge of data. On the other hand, parsing, completing, and suggesting keywords, lists, projects, and contacts requires explicit knowledge of the existing or predefined lists, projects, contacts, and keywords. The parser 300 of the preferred embodiment is data-independent. In other words, it is not aware of any files or databases. Therefore, the parser 300 must be initialized with lists, projects, contacts, and keywords. The initialization process usually occurs during the boot time of the application that uses the parser 300, or when the application switches to another set of data. The following pseudo code illustrates a typical initialization of the parser 300 of the preferred embodiment:

declare list, project, contact, keyword as strings
for every list in database AddList(list)
for every project in object database AddProject(project)

for every contact in object database AddContact(contact)

for every keyword in object database AddKeyword (keyword,list,project,contact)

After this initialization, the parser 300 knows about all the lists, projects, contacts, and keywords. It is now able to correctly auto-fill, parse, and suggest keywords upon request from the client. Of course, the parser 300 must be kept in synchronization with the data in the object database 850; changes in the object database 850 should be reflected in the parser 300. Updates are accomplished using Add, Delete, and Rename function calls. As an example, consider the following situation: a user deletes an existing project named "Paint Fence". The application removes the project from the object database 850 and removes (or updates) its associated keywords. This change must be reflected in the parser 300 and can be done with a single function call as follows:

DeleteProject("Paint Fence");

This single function call will remove the project and any references to it from the parser 300. The project name will no longer auto-complete and all of the keywords that are associated with the "Paint Fence" project will be automatically removed or updated. Note that DeleteProject(), AddProject(), and RenameProject() return values indicating success or failure of the function. For the sake of simplicity, the previous examples ignore the return values.

The Rename functions support renaming of lists, projects, contacts, and keywords. Renaming a list ("list" is used as an example—it can be replaced by "project" or "contact") is easily done in the object database 850. It is effectively a simple database update operation. Because the list has a primary key in the object database 850, and the keywords that are associated with the list are related to the list via this key (rather than the list's name), modifying the name of the list will not affect its associated keywords. In other words, the keywords will remain linked to the list after the name change.

The Rename functions of the preferred embodiment are as follows:

BOOL WINAPI EXPORT RenameList(const char FAR* sOldList, const char FAR* sNewList);

BOOL WINAPI EXPORT RenameProject(const char FAR* sOldProject, const char FAR* sNewProject);

BOOL WINAPI EXPORT RenameContact(const char FAR* sOldContact, const char FAR* sNewContact);

BOOL WINAPI EXPORT RenameKeyword(const char FAR* sOldKeyword, const char FAR* sNewKeyword);

A single function call to any of the above functions will handle the entire renaming process, and will simplify the client's task.

Retrieving Results from the Parser

In order to retrieve information from the parser 300, a client must allocate buffers and pass them into the parser 300 DLL via function calls. Parsing information is retrieved using the ParseOutput Data Structure 830, which is defined as follows:

```
typedef struct_ParseOutput{
  char sList[BUFFER_SIZE];
  char sProject[BUFFER_SIZE];
  char sContact[BUFFER_SIZE];
  char sDelegate[BUFFER_SIZE];
  char sDate[BUFFER_SIZE];
  char sTimeBegin[BUFFER_SIZE];
  char sTimeEnd[BUFFER_SIZE];
  char sDateEnd[BUFFER_SIZE];
  long nFrequency;
  BYTE bRecurring;
  BYTE nUnits;
  BYTE nWeekdays;
  BYTE nWeekdayPos;
}ParseOutput, *ParseOutputPtr;
```

The client of the parser 300 DLL allocates a ParseOutput data structure ("struct" or "type" in Visual Basic), and passes it along with the input expression to be parsed using any of the following function calls:

Parse()

DateParse()

Keyword suggestions are retrieved from the parser 300 using the KeywordSuggestion structure, defined as follows:

```
typedef struct_KeywordSuggestion{
  char sKeyword1[BUFFER_SIZE];
  char sKeyword2[BUFFER_SIZE];
  char sKeyword3[BUFFER_SIZE];
}Keyword Suggestion, *KeywordSuggestionPtr;
```

The client of the parse DLL allocates a KeywordSuggestion data structure, and passes it along with an input expression using any of the following function calls:

SuggestListKeywords()

SuggestProjectKeywords()

SuggestContactKeywords()

Auto-completion (auto-fill) requires only a character buffer which can be declared by the client as:

char sBuffer[BUFFER_SIZE];

in C or C++, or

Dim sBuffer As string * BUFFER_SIZE in Visual Basic. The buffer, along with the expression to be completed, is then passed into any of the following function calls:

AutoFillList()

AutoFillProject()

AutoFillContact()

Handling Recurring Dates

The present invention supports recurring date parsing by use of the following fields of the Parse Output Data Structure. These fields are:

nFrequency: Long. Null value=0. "five days"→nFrequency=5.

nUnits: BYTE. Null value=0. DAYS=1, WEEKS=2, MONTHS=3, YEARS=4.

nWeekdays: BYTE. Null value=0. SUN=1, MON=2, TUE=4, WED=8, THU=16, FRI=32, SAT=64. All possible combinations of weekdays can be stored. For example, Sat and Sun=64+1=65. Mon, Tues, and Wed=14. To find out if nWeekdays includes a specific weekday, simply "bitwise and" that weekday with nWeekdays (& operator in C/C++, "and" operator in Visual Basic). If the result of the bitwise operation is zero, then the weekday is not included in n Weekdays; otherwise, it is.

nWeekdayPos: BYTE. Null Value=0. $1^{st}$, $2^{nd}$, $3^{rd}$, $4^{th}$, or $5^{th}$ weekday of a given month. Thus, "the second Monday of July" would imply that nWeekdayPos=2.

Finally, a boolean value is provided to signal whether we are dealing with a simple date or a recurring date:

bRecurring: BYTE. False=0. True=anything else. If bRecurring=True, sDate serves as the staring date of the recurring event.

The parser 300 doesn't require end dates. That is, recurring events are assumed to go on "forever" (the user must use the user interface 200 to specify a full range). The "sEndDate" field in the ParseOutput data structure, is nonetheless provided to support specified end dates. A starting date, however, is always provided when a recurring date is parsed. Although the parser 300 doesn't require starting dates (i.e., every Friday starting on 8/8/97), it always tries to guess (intelligently) a starting date for the recurring event. This starting date will be passed via the ParseOutput struct in the sDate field.

Collaboration

Collaboration support is provided in the preferred embodiment of the present invention. The parser 300 looks for two possibilities at the beginning of each keynote. Note that other similar keywords triggering collaboration could also be provided.

The word "please" (or "pls") immediately followed by a contact keyword.

A contact keyword immediately followed by the word "please" (or "pls").

The parser 300 also accepts a single or multiple punctuation (comma, period, colon, and semicolon) between the contact keyword and the word "please" (e.g., "Brian. Please . . . " or "Please, Brian . . . ").

When the parser 300 recognizes this keynote sequence, parser 300 fills the sDelegate field of the ParseOutput data structure with the contact name (pointed to by the contact keyword). The next contact keyword (if any) will appear in the sContact field. For example, consider the two contacts, "Brian Smith" (keyword="brian") and "Danny Jones" (keyword="danny"). The input expression:

"Brian, please call Danny and arrange for all of us to go to lunch tomorrow at 2 pm"

will result in the following ParseOutput data structure fields:

sDate=<tomorrow's date>
sTimeBegin=14:0
sDelegate="Brian Smiga"
sContact="Danny Rabbani"

Further details on collaboration support of the present invention are provided in a subsequent section this document.

Object Database

The object database 850 of the present invention supports arbitrary association of one type of object in the database with one or more other objects of any type. The object database 850 also supports collaboration (including negotiation and tracking action requests to completion) between two users of the present invention who may or may not share a common server.

Referring now to FIGS. 15–18, various tables maintained within object database 850 are shown. Note that the table keys are shown only for illustrative purposes.

Types of Objects

FIG. 15 shows the object type table of the preferred embodiment. There are several types of objects currently supported in the database of the present invention. A representative portion of these types of objects are shown in FIG. 15 along with a description of the type of the particular object in the preferred embodiment. Because the object types are stored in a table in the object database 850, an object type can be added, deleted, or modified at run time. This is useful for supporting user-defined types of information or objects (e.g., a "GPS Location").

Association of Object Types to Tables Where They Reside

Every type of object listed in FIG. 15 is stored in the object database 850 in one of several tables. The association between the object type the table in which it resides is retained in the object association table shown in FIG. 16. As the object association table shown in FIG. 16 illustrates, multiple types of objects may be associated with—and thus actually stored in—the same table. For example, the object types of: Person, Delegate, FYI, and Attached Person are all associated with the "People" table.

Object Links Table

The links table of the preferred embodiment is a special table in the database of the present invention that allows free association of one object of any type to another object of any type. For example, the links table allows the present invention to associate a Person object type to an Email Address object type. Note that the same Person could also be associated with additional email addresses, each represented in the Links table as separate entries.

Referring to FIG. 18, a sample link table is illustrated. As shown, the columns (structure) of the link table includes the specification of a two keys and two object types: key 1, type 1, key 2, and type 2.

Every object in the object database 850 of the present invention has a unique identifier, or key, associated with the object. These keys are stored as part of the record, or entry, describing an object in a particular table. For example, Brian Smiga is an instance of a Person object type with a key of 101; Brian's first name and last name, as well as his object instance key, will be stored directly in the People table as part of a single record.

As indicated previously, every object in the database of the present invention also has a type associated with it. Given the object key and object type of one object and the key and type of another object, the two objects may be "linked" via a single entry (record) in the links table, a sample of which is shown in FIG. 18.

For example, if "Brian Smiga" represents an instance of a Person object type with a key 101 and "smiga@actioneer.com" represents an instance of a corresponding Email Address with a key 102, the "Brian Smiga" object instance may be linked to his corresponding "smiga@actioneer.com" email address instance in the link table as follows:

| Key 1 | Type 1 | Key 2 | Type 2 |
|---|---|---|---|
| 101 | 5 | 102 | 13 | where a Person object type has a key 5 and an Email object type has a key 13. The above example of a links table entry indicates that Brian Smiga (key=101) of type Person (5) is associated to (i.e. linked to) smiga@actioneer.com (102) of type Email Address (13). In the preferred embodiment, entries are always stored in the links table such that the value of Type 1 is less than or equal to the value of Type 2. This table organization aids in searching.

Sample Database Representation

Referring now to FIG. 17, an example illustrates the organization and use of the various tables in the object database 850 of the present invention. The columns shown for each table are only a subset of the columns actually in the database of the present invention. For example, Projects also have an associated Outcome (goal), which would be saved in a separate column in the Projects table. Additional information about a project might be entered in another table, such as Simple Date (which would include the start, due, and completion dates for the project), and linked to the associated Project via the links table as described above. Additional information about any of the contacts in the Contacts table might be entered in a Physical Address table, the Email Address table, etc. and linked to the associated Person via the links table as described above. Note that in the table representations illustrated in FIG. 17 and 18, the italicized columns showing descriptions of the linked items do not actually appear in the database of the preferred embodiment. Rather, they are shown here for purposes of clarification in this patent application.

Given the initial database table content shown in FIG. 17, suppose a user named "Dennis Buchheim", creates a keynote by entering a text expression into a keynote region 220, the sample keynote reading as follows:

"Brian, please call Jim tomorrow re patent status"

Further suppose the user attaches the Person "Jim Salter" and the Project "Patents", also sending an FYI keynote to Tom Hagan as described in detail above. In this example, the parser 300 of the present invention will automatically determine many of the links that need to be established in the tables shown in FIG. 17: keyword "Brian" will be recognized as a keyword linked to "Brian Smiga," who is a Delegate of the keynote; keyword "call" will be recognized as a keyword linked to the "Calls" list; keyword "Jim" will be recognized as a keyword linked to the contact person "Jim Salter"; "tomorrow" will be recognized as meaning 2/8/97 (or whatever the current date is plus one day); and "patent" will be recognized as a keyword linked to the "Patents" Project. The remaining links will be determined by the user interface 200, in which the new keynote was created.

Once the new keynote is filed by user Dennis, the following significant data will be recorded in the object database 850 by the present invention:

An envelope (Type=0) will be added as a container for the keynote being sent to a delegate person. The Envelope includes such data as a subject for the note, when the note was used, or when it is received in a standard email client. Assume that this Envelope was assigned a database key of 212 by the object database 850.

A List Item (Type=1) will be added for the note and would read "Brian, please call Jim tomorrow re patent status". Assume that this List Item was assigned a key of 213 by the object database 850.

Several link table entries would be created for the new keynote in this example. The sample table resulting from sample input keynote is shown in FIG. 18. These entries in the links table (and one or two less significant additional entries) as shown are sufficient to describe the note that was entered as an example.

It will be apparent to those of ordinary skill in the art that the object database 850 implementation of the present invention as described herein is of broader applicability than strictly for use with the natural language parser 300 as described herein. In an alternative embodiment, the input text data may be provided as a structured record or buffer from which the object database 850 extracts the information necessary to create the link table shown by example in FIG. 18.

Collaboration Between Two or More Users of the Present System

The present system allows a user to manage his or her own actions/projects and time more effectively. In many cases actions/projects have to be handled by more than one person. The collaboration cycle described below allows interaction between users to further completion of actions/projects and to allow information to be efficiently exchanged between users of the present system.

FIG. 1, descried above, illustrates a typical data processing system upon which one embodiment of the present invention is implemented. It is understood that the present invention utilizes at least one instance of the system, for the originator of the action request. In one embodiment, the communication device 125, described above, allows the users to collaborate as will be described below. Alternatively, the computer systems of users may be directly coupled. Alternatively, multiple users may be using the same computer system.

In addition to parsing input text, the parser 300, described above, further utilizes the keywords to "classify" the text entered. In one embodiment, the message types are shared and personal. Shared messages include: FYI and action requests. Personal messages include personal action and personal memo. Of course, other message types may be utilized.

An action request is input text which is sent out to at least one other person, and requires a response. It generally asks another user to do something. In one embodiment, the keyword "please" may initiate an action request. As discussed above, other keywords may be added to the list, at the user's discretion. For example, a user may add the keywords "I need you to", "pls", or similar words to indicate that the text entered is an action request. Thus, the sentence "Joe, I need you to call Bill about the Project X deadline" is classified as an action request, targeted at Joe. The contact is Bill, and the project is Project X. There is no date, since the requester did not include a date. Such analysis may be done using the parsing methods described above. However, the present system is not limited to the parsing method described above. Other methods of identifying the target, contact, project and date may be utilized.

An FYI, or "for your information," is input text that is sent out to at least one other person, and requires no response. It is used to inform others about facts. For example, and FYI might be used to inform others that a new manager has been brought in. Keywords for an FYI type may be "FYI", "For your information", "Please note", and any other keywords which the user included in the keyword list. Generally, the targets of the FYI are deduced from the proximity to the keyword. For example, an FYI which read "John, FYI, Tom is in charge of Project X now." would send a copy of this FYI to John.

A personal action/memo is text that is not sent to anyone. The absence of the other keywords would indicate that an entry is classified as a personal action/memo. For example, the input text "Call Jim about Project X" is a personal action. It is filed in the user's own system, as described above, but is not forwarded to anyone else.

Framework for Collaboration

Figure 19:
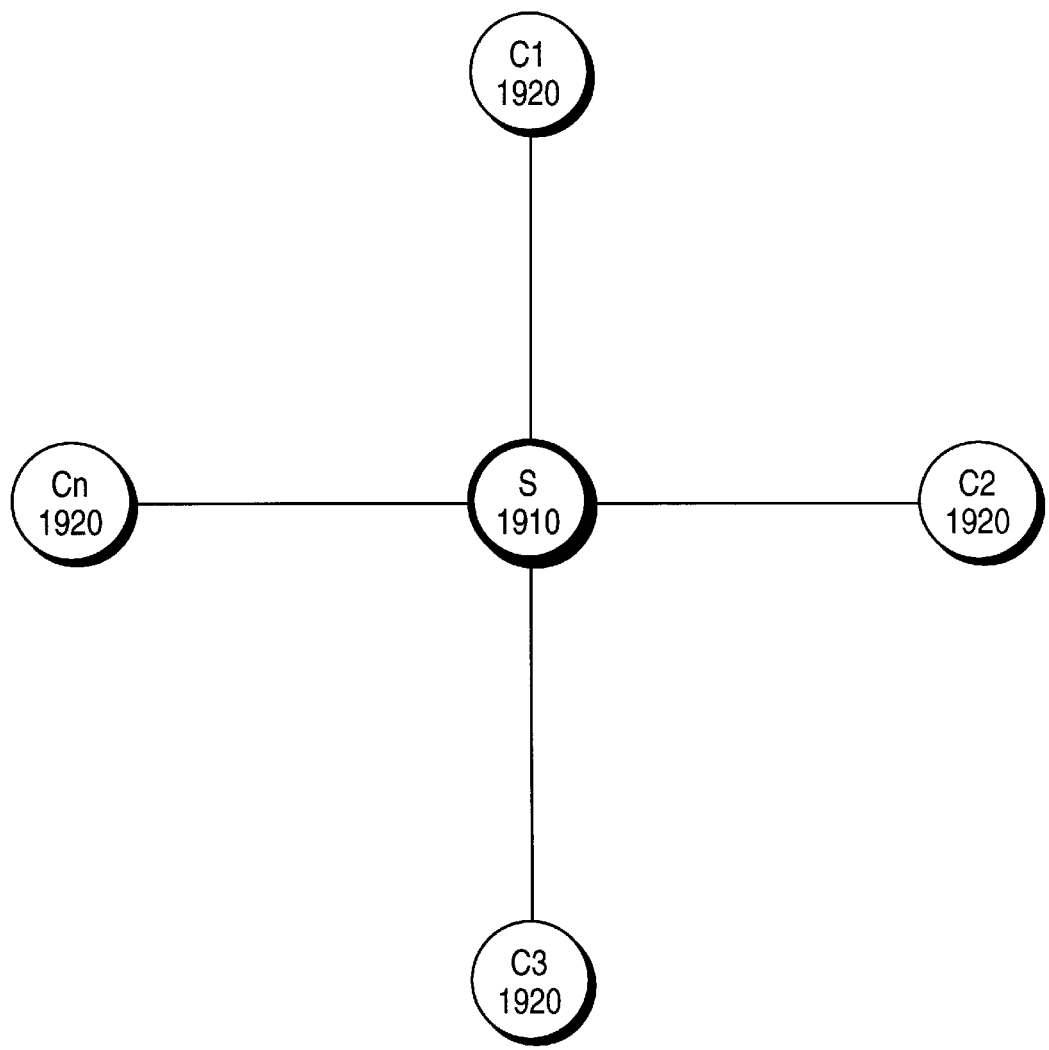
FIG. 19 is a diagram of a client-server system.

The present system may be implemented on a number of different frameworks. FIG. 19 is a diagram of a client-server system. The client server system consists of a server 1910, and a plurality of clients 1920 connected to the server 1910. The server 1910 stores the information regarding the action requests sent between users and the database(s) to support the interaction. This assumes, and necessitates, the existence of a server in a client-server system. In addition to being expensive and complex, this limits collaboration to members of the limited group sharing access to the server 2010. In other words, it is limited to a closed loop of clients C1 . . . Cn 2020 who have access to the server 1910. This means that the collaboration system can not be used for interacting with individuals outside of the client-server framework.

Figure 20:
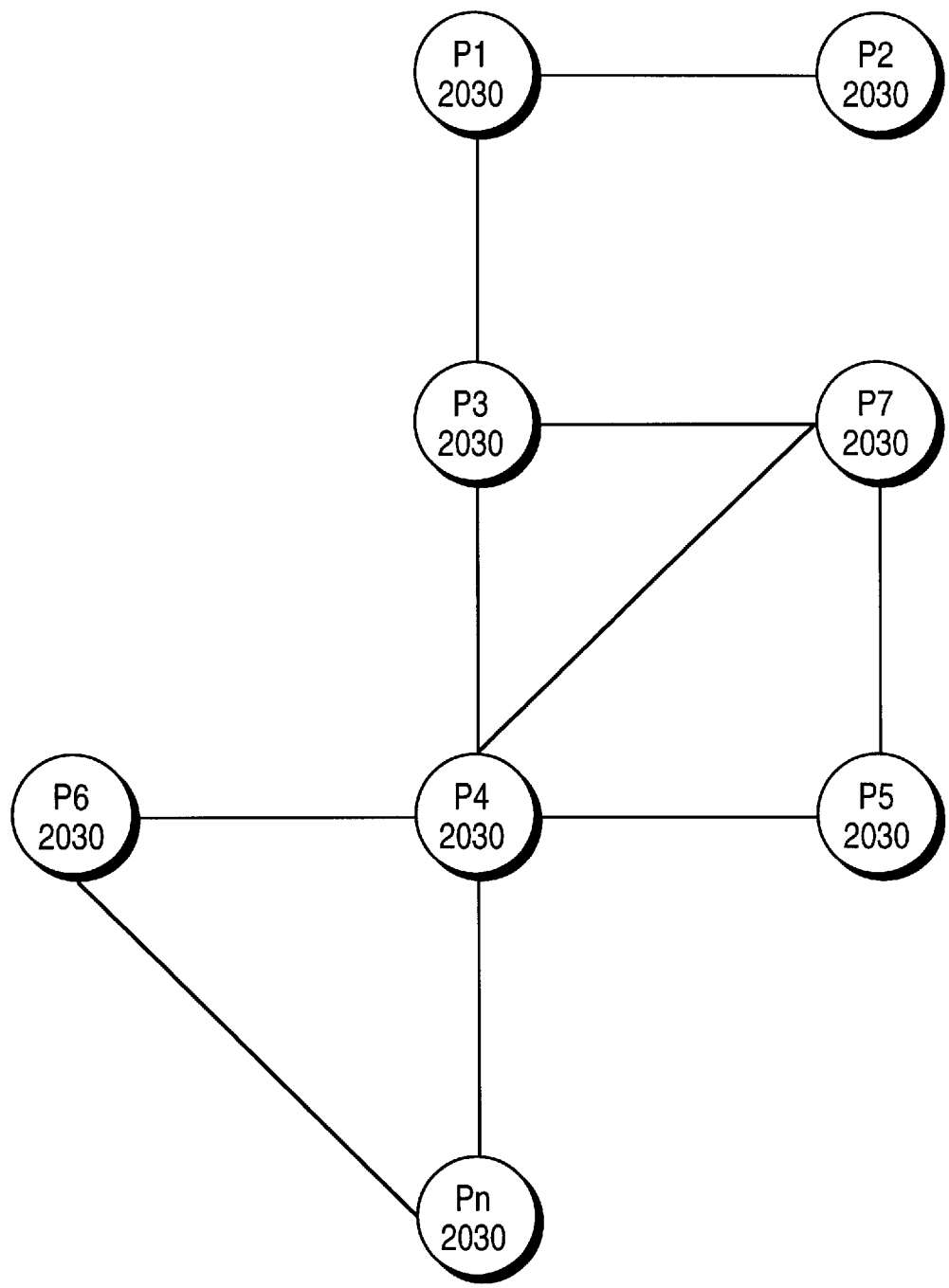
FIG. 20 is a diagram of a peer-to-peer distributed system.

FIG. 20 is a diagram of a peer-to-peer distributed system. A number of peers P1 . . . Pn 2030 are interconnected. The peer-to-peer system allows any two peers to communicate over the system, even if not directly linked. This distributed system model parallels the Internet. Thus, any two individuals can communicate using the peer-to-peer distributed system, as long as both individuals have access to an e-mail address. In one embodiment, the peer-to-peer distributed system can be expanded to include such mechanisms as voice mail, personal digital assistants, and any other mechanisms capable of receiving and/or sending messages.

The distributed peer-to-peer system enables communication with users who do not utilize the present system. Thus, the present system allows seamless integration of all action requests, and to-do-lists, regardless of whether the recipient is a subscriber to the present system or not. In one embodiment, the peer-to-peer distributed system model is used for the present invention.

Keeping Track of Action Requests

Utilizing a distributed system necessitates an alternative means of keeping track of action requests. Because there is no server which tracks each action request, a method of identifying each action request and its associated objects, such as project, sender, etc., is needed. This method enables the system to match replies to the proper action request.

contain the action request. The envelope includes a subject, and links to the list item, as well as the e-mail addresses of recipients. Below, only the actions occurring in Brian's system are described. However, similar activity occurs in Tom's system.

When Brian receives the action request, several Link table entries are created for the new action request. These Link table entries parallel the entries in Dennis' table, described above. Since the local key numbers are unique to the database of the individual, these key numbers may be different. In addition, Brian's system generates a number of entries into a Foreign Key table. The Foreign Key table is utilized in mapping a collaborative action request in one database, part of the sender's system, to the same action request in another database, part of the recipient's system. This link is represented by associating the Envelopes containing the corresponding List Items.

| Creator | Local Database | Local Key | Foreign Database | Foreign Key |
|---|---|---|---|---|
| SMTP | Brian's Database ID | Brian's Received envelope key | Dennis' Database ID | Dennis' Sent envelope key (212) |
| SMTP | Brian's Database ID | Brian's key for note creator (Dennis) | Dennis' Database ID | "me" key for Dennis |
| SMTP | Brian's Database ID | Brian's key for creator's e-mail address (Dennis) | Dennis' Database ID | "my e-mail" key for Dennis |
| SMTP | Brian's Database ID | "me" key for Brian | Dennis' Database ID | Dennis' key for delegate (Brian) |
| SMTP | Brian's Database ID | "my e-mail" key for Brian | Dennis' Database ID | Dennis' key for delegate's e-mail address (Brian) |
| SMTP | Brian's Database ID | Brian's key for linked person (Jim) | Dennis' Database ID | Dennis' key for linked person (Jim) |
| SMTP | Brian's Database ID | Brian's key for FYI recipient's e-mail address (Tom) | Dennis' Database ID | Dennis' key for FYI recipient's e-mail address (Tom) |
| SMTP | Brian's Database ID | Brian's key for linked project (Patents) | Dennis' Database ID | Dennis' key for linked project (Patents) |
| SMTP | Brian's Database ID | Brian's key for sender | Dennis' Database ID | Dennis' key for sender |
| SMTP | Brian's Database ID | Brian's key for sender e-mail | Dennis' Database ID | Dennis' key for sender e-mail |

In one embodiment, a foreign key table is utilized to keep track of action requests. To clarify, the example described above with respect to FIGS. 15–18, is continued. The action request in question was:

| | |
|---|---|
| Delegate: | Brian |
| From: | Dennis |
| FYI: | Tom |
| Subj.: | Action Request: Please Brian, call Jim . . . |
| Encl.: | Project Information, Contact Information |
| Text: | Please Brian, call Jim re: patent project. |

The format of the action request does not reflect the actual format of the action request displayed on the present system. The appearance of such an action request is described below. This action request was entered by Dennis, and sent to Brian. In addition, an FYI copy of the action request was sent to Tom. This is to alert Tom to the action request. When the action request is generated, an envelope is generated, to Table 1

The creator column is the creator of the entries in the Foreign Key table. The creator column displays the device which received the action request. In this example, it was the simple mail transfer protocol (SMTP) plug-in which received the action request from Dennis.

The Local Database column contains a unique identifier identifying the delegate's (Brian's) database. The Foreign Database column contains a unique identifier identifying the requester's (Dennis') database. In one embodiment, the identifier is a Globally Unique Identifier (GUID), which is a 128-bit value based on the Ethernet address of the machine on which the GUID is generated, as well as the time at which the GUID was created. Alternatively, other unique identifiers may be utilized.

The Local Key and Foreign Key are the key numbers from the Database tables of the individuals. The example keys described above with respect to Figure X are included in the Foreign Key table, i.e. Dennis' database entries. For example, the local key for note creator (Dennis) is the key number associated with Dennis in Brian's database. The "me" key is a special purpose value utilized because the user's database may or may not contain information identifying the user himself or herself, and it is unreliable to match user names via text comparison. This method allows for a match to be indicated. The "my e-mail" key is a similar key for the e-mail address of the database owner. Additionally, a parallel table is generated in Dennis' system when Dennis receives a reply from Brian. Of course, in Dennis' system, Dennis' database ID is the Local Database, while Brian's is the Foreign Database.

Foreign Key entries are also created on both sides (requester and delegate) for the Person and Project linked to the action request, as well as the Creator (another Person) of the action request, the Sender (another Person) of the action request, the Delegate, and any Email Address associated with the action request. The Person, Project, etc. entries are created to ensure that the correct links are created/maintained on reply and that duplicate entries are not created in any user's database.

In an alternative embodiment, the e-mail addresses of the sender and the recipient, coupled with a unique identification attached to the action request itself identifies the action request. In another alternative embodiment, a unique local identification coupled with a public key/private key identification of the sender/recipient is utilized to identify each action request.

Collaboration Cycle

Figure 21:
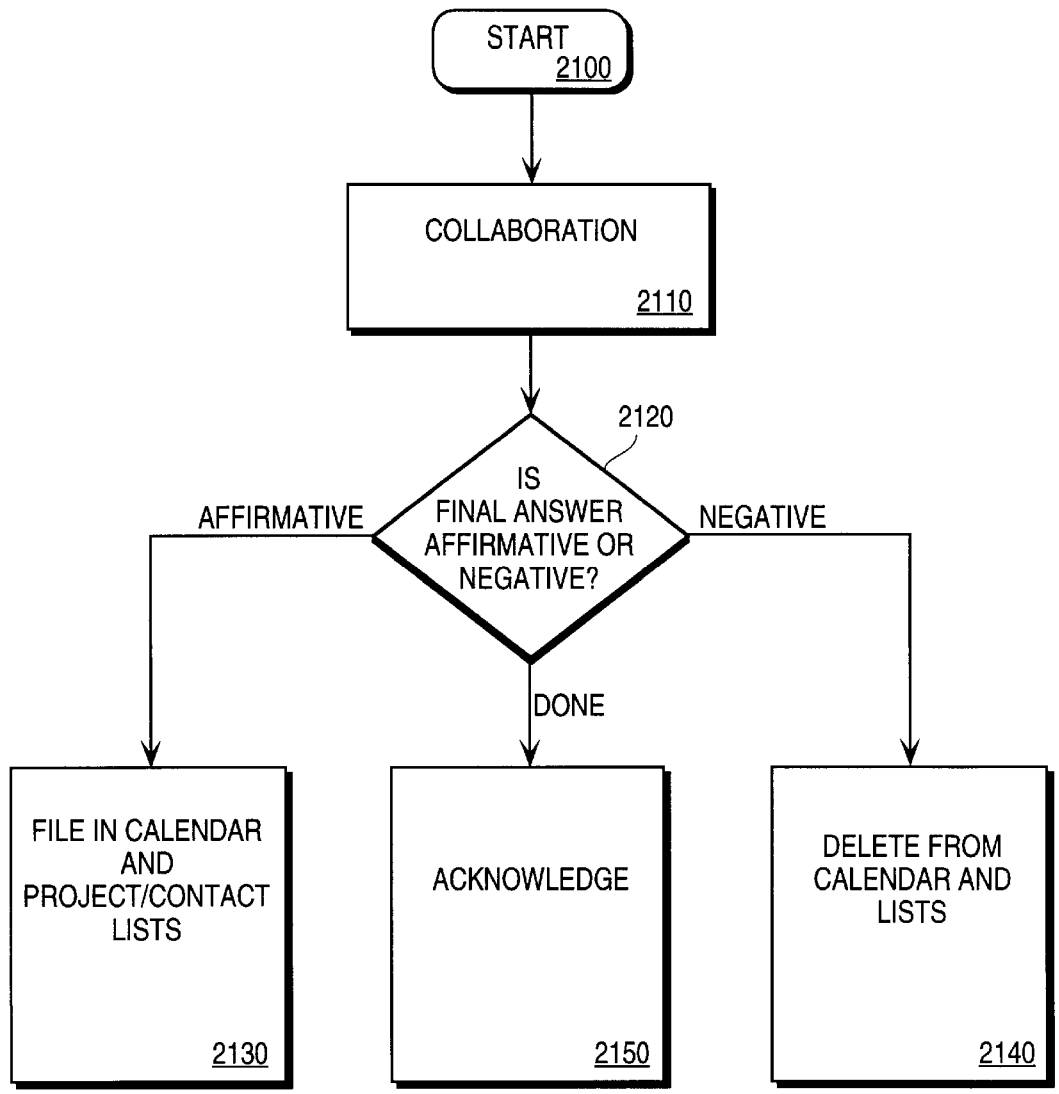
FIG. 21 is a flowchart illustrating an overview of the present invention.

FIG. 21 is a flowchart illustrating an overview of the present invention. At block 2100, the present collaboration cycle starts. It is initiated by a requester sending a message to a delegate or delegates.

At block 2110, there is collaboration between the systems of the requester and delegate or delegates. This collaboration involves a complex series of negotiation steps that are designed to arrive at a final answer. This is described in more detail below.

At block 2120, the process queries whether the final answer is affirmative or negative, or done. An affirmative answer occurs when the parties agree to perform the task. A negative answer occurs when the parties decide to not perform the task.

If the final answer is affirmative, the process continues to block 2130. At block 2130, the final answer is filed in the appropriate calendars and lists, including lists associated with contact, project, if appropriate. These lists will be referred to hereinafter as project/contact list. Where it is filed depends on the interpretation of the original action request, and the collaboration process, as described below.

If the final answer is negative, the process continues to block 2140. At block 2140, the action request, and collaborative updates of the original action request are deleted from the calendar and lists. This process is further described below.

At one point, unless a negative reply was received, the delegate sends a Done reply to the requester. A Done reply may be sent by the delegate using the process described below. Alternatively, when the delegate checks the action/project off his or her calendar and/or project/contact lists, an automatic Done reply may be generated and sent to the requester.

When the requester receives the Done reply, the original action request is marked done in the requester's system. Additionally, in one embodiment, an automatic acknowledgment form is generated. In one embodiment, an acknowledgment form consists of a generic text, such as "Thank you for completing my action request regarding the 'Project name' project." In one embodiment, different types of acknowledgments may be associated with different delegates. For example, the requester may identify certain delegates that should receive a thank you voice mail, or document. In those instances, such an acknowledgment may be automatically generated by the system. In one embodiment, the user may select the type of acknowledgment. In one embodiment, the requester only receives a notification that an acknowledgment should be sent.

Figure 22A:
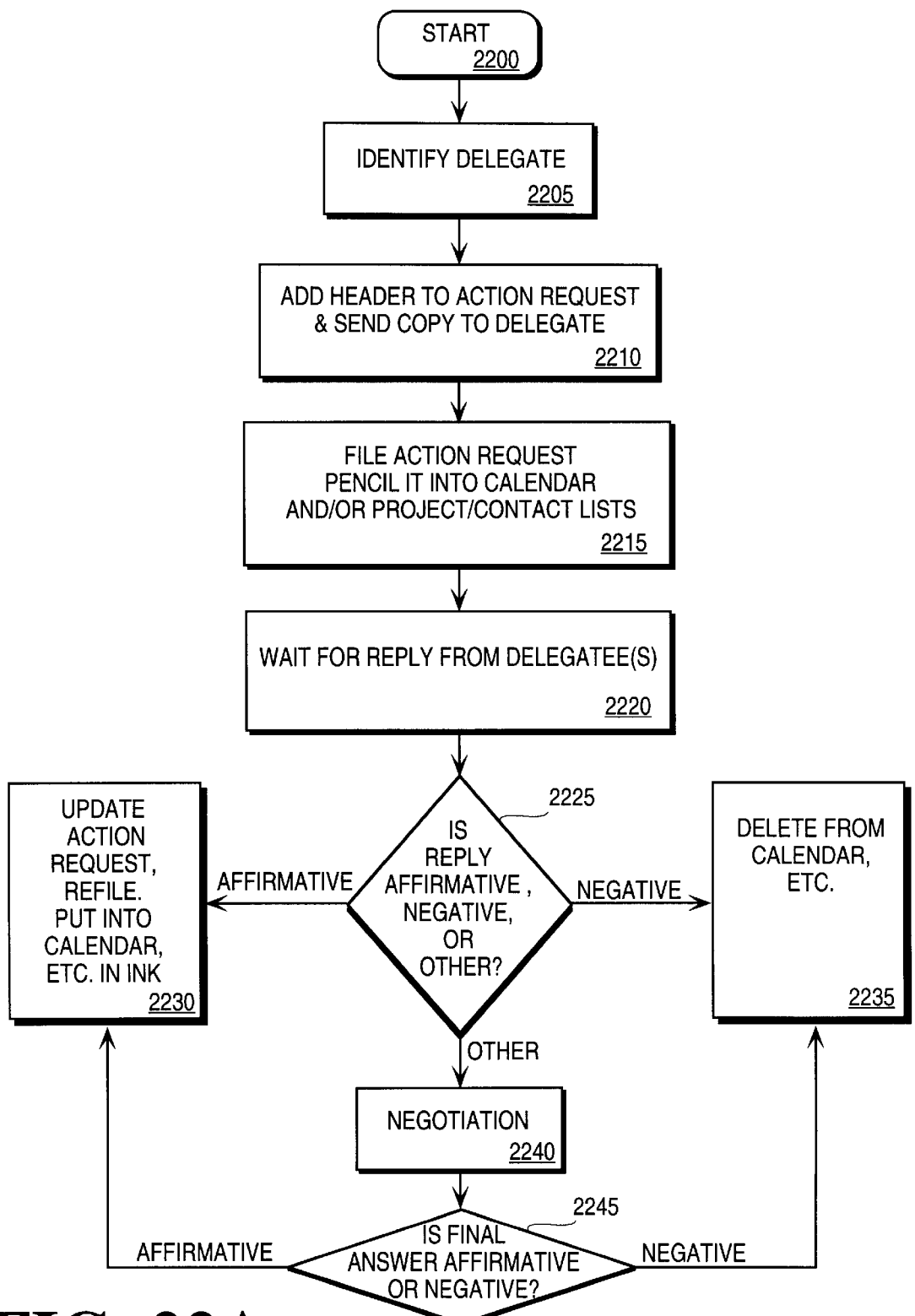
FIG. 22A is a flowchart illustrating the collaboration cycle as viewed by the originator, or requester.

FIG. 22A is a flowchart illustrating the collaboration cycle as viewed by the originator, or requester. The process starts at block 2200, when an input text has been parsed, and classified as an action request. In one embodiment, this occurs when the parser detects the keyword such as "please".

At block 2205, the process identifies the delegate. An action request can be addressed to one or more parties. These parties are the delegate. As described above, in one embodiment, the names prior to, or following, the keyword "please" are generally considered the delegate. As descried above, the user may have added additional keywords which indicate that the present entry is an action request.

The delegate may be an individual or a group. For example, an action request could be addressed to "managers". In that instance, the keyword "manager" could include a plurality of managers. In one embodiment, for multiple delegates, separate action requests are spawned for each delegate, and each delegate is dealt with individually. For simplicity's sake, the remainder of this flowchart will assume that there is only a single delegate.

In one embodiment, a header is generated when the delegate is identified. In one embodiment, the header includes a number of fields. In one embodiment, these fields include: Delegate, FYI, and Enclosures. The Delegate field includes the delegates, which are determined as described above. The FYI field is determined in a similar way. In one embodiment, the Delegate field maps to the To field, the FYI maps to the CC field in other messaging applications.

The Enclosures field enables the requester to attach a variety of items to the action request. In one embodiment, the enclosures may include arbitrary files or information about the projects and the contacts related to the action request. This is especially useful when an action request is sent to a delegate who is not using the present system. In that instance, the message received by the delegate may not be linked to database(s) with information about contacts or projects. Thus, by attaching those items, the requester can simplify the recipients' work.

The requester's name is placed in the From: field. The header may also include a subject. The subject may be the first few words of the action request, the project to which the entry was parsed, or may be entered by the author of the action request. In one embodiment, the subject appears as "Action Request: <first few words of request>," or "FYI: <first few words of FYI>." This makes apparent to the recipient the type of message received, in addition to giving some information about the subject matter of the message. At block 2210, the action request is sent to the delegate. The action request may be sent via electronic mail or any other means. In one embodiment, the action request is sent directly to the delegate's in-box in the system of the present invention. In one embodiment, if the delegate is not utilizing the present system, the action request is sent to the delegate's address. In one embodiment, this may include the delegate's e-mail address, fax number, voice email number, or pager.

Much of the filing and similar actions described in the present application require the use of the system of the present invention However, action requests may be sent to any individual who has a receiver object, which can receive text or voice in some format. In one embodiment, if the delegate does not have an e-mail connection, the action request can be faxed to the delegate. In one embodiment, the present system may format the action request in a rich text format (RTF) and fax it to the delegate. In one embodiment, the action request may be turned into a voice mail message and sent by the present system. In another embodiment, the action request may be sent as a pager message to a pager.

In one embodiment, the action request is formatted into an ASCII format, which is readable by a user. In one embodiment, the action request is reformatted to read as follows:

"Text of the original action request."

This is an Action Request for "Delegate" from "Requester".

It relates to:

Project: "Project"

Contact: "Contact"

Due Date: "Due Date"

Attachments: "Enclosures"

The text in quotation marks is inserted based on the information from the action request. This text format is sent, and is readable by delegates who are not subscribers to the present system.

At block 2215, the action request is filed, and penciled into the appropriate calendars and/or project/contact lists. In one embodiment, the action request is filed in the "Waiting For" list. This is a list which contains action requests which have not been resolved. In one embodiment, a copy of the action request is also filed in the project/contact list to which it was parsed. Additionally, if appropriate, the action request is penciled into any lists, projects, contacts, and calendars that it was parsed to. "Penciling" indicates entry into a calendar or project/contact list in a different color. This allows the user to easily identify items which are not yet agreed upon. In one embodiment, penciled items appear in gray, compared to normal entries in black or blue.

At block 2220, the process waits for a reply from the delegate. The process does not remain in a wait state, but rather continues to execute other processes. However, this action request cycle waits for completion. When the reply from the delegate is received, the process continues to block 2225. The reply from the delegate appears in the in-box of the requester. In one embodiment, if there is no reply a reminder is sent before the due date.

At block 2225, the process queries whether the reply is affirmative, negative, or an other category. These categorizations are described below with respect to FIG. 22B. In one embodiment, the reply list is selected by the delegate by selecting from a preset selection or replies. In an alternate embodiment, the reply is reparsed to determine the appropriate reply list. In one embodiment, the date is reparsed. In an alternate embodiment, all of the reply is reparsed and reclassified.

If the reply is affirmative, the process continues to block 2230. At block 2230, the original action request is updated and refiled. As described above, the action request is originally in the Waiting For list. Now, the action request is recategorized to the appropriate list, as determined from the parsing. The action request is also placed into the calendars and project/contact lists in ink. In one embodiment, writing in ink comprises entering the request in a different color from penciling. In one embodiment, ink is a black or blue color.

If the reply is negative, the process continues to block 2235. At block 2235, the action request is deleted from the calendar and from the Waiting For category. At this point, the process is closed, since the delegate has refused to complete the request. However, the negative reply remains in the in-box of the delegate. Thus, if the requester wishes to reassign the project, he or she can do so using the copy in the in-box.

If the reply is other, the process continues to block 2240. At block 2240, the requester and delegate negotiate. The negotiation process is described in more detail with respect to FIG. 23. When the negotiation is completed, the process continues to block 2245. At block 2245, the process once again queries whether the final answer is an affirmative or negative. If the final answer is affirmative, the process returns to block 2230. If the final answer is negative, the process returns to block 2235.

Figure 22B:
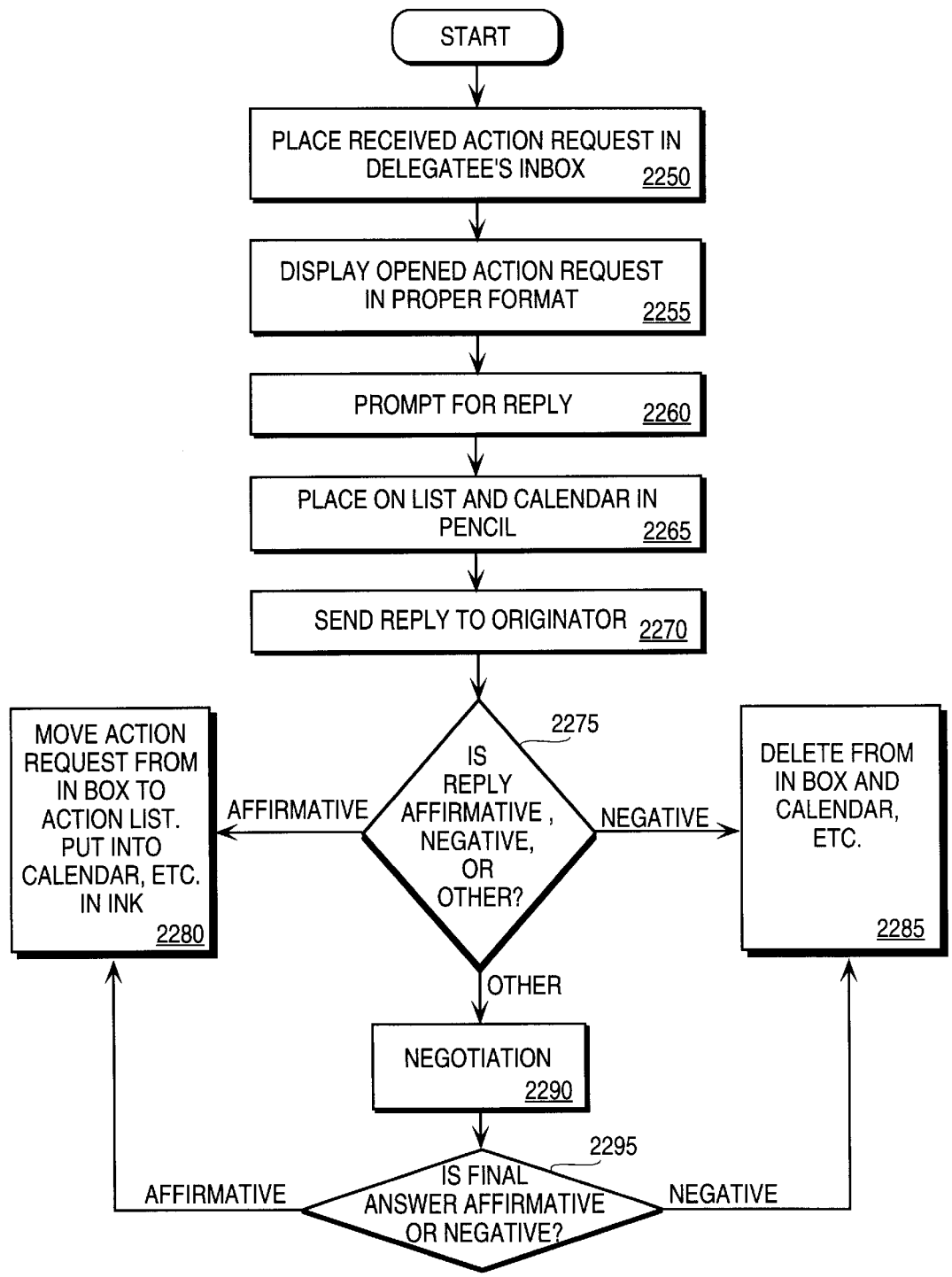
FIG. 22B is a flowchart illustrating the collaboration cycle as viewed by the recipient, or delegate.

FIG. 22B is a flowchart illustrating the collaboration cycle as viewed by the recipient, or delegate. At block 2250, a copy of the received action request is placed in the delegate's in-box. In one embodiment, the in-box is a part of the present system. In an alternative embodiment, the in-box may be the e-mail box of the delegate. In one embodiment, if the delegate is not a user of the present system, the in-box is the delegate's e-mail address box. In one embodiment, the in-box is also a list in the present system, into which received action requests are placed.

At block 2250, the opened action request is displayed to the delegate. In one embodiment, if the delegate is using the present system, the action request is displayed in the format described above, with respect to FIG. 4. If the delegate is not using the present system, in one embodiment the delegate can open the action request as an e-mail message. If the delegate opens the present invention as an e-mail, it appears as plain or formatted text, which is human readable. The format of the text is as it appears above. In an alternative embodiment, if the delegate opens the information in any format that permits linking, enclosures are linked to the text. In one embodiment, if the delegate opens the action request in a Web browser, it appears in hypertext markup language (HTML) format. In one embodiment, enclosures appear at the bottom of the document. In one embodiment, in HTML, enclosures may be linked to the appropriate information in the text. For example, if the requester enclosed the contact information, the contact name is linked to that enclosure. Thus, when the delegate selects the contact name, the enclosed contact information is displayed. Other means of displaying text are well known in the art.

Once the action request has been opened, the delegate may further delegate the action request. Of course, if the delegate is not using the present system, he or she can not do this, except through standard e-mail communication. At this point, in one embodiment, the user can further delegate the action request by adding a "Please 'new delegate'" to the action request This, in reparsing, directs the action request to the new delegate. In an alternative embodiment, the user can manually select a new delegate in the header, and thereby forward the action request. The action request is readdressed to the new delegate, and sent on. The original delegate becomes a requester at this point. However, the original delegate is still has to respond to the original requester.

At block 2260, the user is prompted to enter a reply. In one embodiment, when the user opens the action request in the in-box, it appears with reply classification choices in a reply box on the displayed action request. In one embodiment, the reply box is a pull-down menu. In an alternate embodiment, the reply box includes radio buttons, or other means of indicating one choice from a number of listed items.

One of these choices can be selected by the user, as the reply to the action request. In one embodiment these choices include: Yes, Yes if, No, Comment, and Done. The Yes reply indicates that the delegate accepts the delegation, and will perform the action requested. A Yes if reply indicates that the delegate is willing to perform the action requested, but is making a counter-suggestion. For example, the counter suggestion may be to change the meeting date. A No reply indicates that the delegate is refusing the delegation. The Done reply indicates that the delegate accepts the delegation, and has completed the project assigned. And finally, the Comment reply indicates something outside of these categories. For example, if the delegate feels that the requester misunderstands the project, this reply may be utilized. Other reply choices may be incorporated without changing the fundamental purpose of the present invention. In one embodiment, these choices appear when the delegate opens the action request in his or her in-box. In one embodiment, the user must select one of these choices. In an alternative embodiment, no such reply options appear. In that embodiment, the user replies in a free-form text. In that embodiment, a parser is used to parse the user's reply, and fit it into one of the above categories.

When the user selects one of these choices, a reply form is created. If the reply was either a Yes, No, or Done, the reply form is complete. The user need not enter any further information. However, the user may enter further information. In one embodiment, if the reply is Yes, No or Done, a header is automatically added to the reply, and it is automatically sent. The user is not prompted for entry.

If, on the other hand, the choice selected is a Yes If or a Comment, a reply form is automatically generated, with the appropriate header information. In one embodiment, if the reply was Yes If, a phrase such as "Yes, I will do it, if" appears, followed by the cursor. The user can then complete this phrase. In an alternative embodiment, the user can delete the phrase and enter his or her own words. In one embodiment, if the Comment button is selected, the phrase such as "I have a comment," followed by the cursor is displayed. Again, the user can either finish the phrase, or erase it and write it differently. In this way, the reply format is automatically filled in based on the reply choice selected.

At block 2265, the action request and reply are placed on the appropriate project/contact lists and calendars of the delegate. The information placed on the lists and calendars is based on the parsed action request and parsed reply. In one embodiment, only the date information is reparsed, and all other information remains. When the delegate opens the action request, preliminary project/contact list, contact, and other information is indicated in the shadow of the action request, in parentheses. However, the delegate can change this information, either directly in the shadow, or by changing the information in the reply.

At block 2270, the reply is sent to the requester. In one embodiment, this occurs when the user presses a button. In one embodiment, there is a send button.

At block 2275, the process queries whether the just sent reply was affirmative, a negative, or other. The affirmative reply includes Yes and Done. The negative reply includes No. The Yes if and Comment replies are classified as other. Similarly, if different categories are utilized, any category which refuses the delegation is negative. Any category which accepts the delegation, without attempting to change it in any way is affirmative. Any other categories are Other.

If the reply is affirmative, the process continues to block 2280. At block 2280, the original action request is updated and filed. As described above, the original action request is on the Out-box list of the delegate. At this point, the action request is refiled based on the results of the parsing. The action request is also placed into the appropriate calendars and lists in ink. In one embodiment, placing the request in the calendar in ink comprises entering the request in a different color from penciling. In one embodiment, ink is a black or blue color. In one embodiment, a notification of the reply remains in the requester's in-box. In another embodiment, the user may select whether or not to receive notification.

If the reply is a negative, the process continues to block 2285. At block 2285, the action request is deleted from the calendar and from the Waiting For category. At this point, the request is closed, since the delegate has refused to complete the request. In one embodiment, a notification of the reply remains in the requester's in-box. In another embodiment, the user may select whether or not to receive notification.

If the reply is Other, the process continues to block 2290. At block 2290, the requester and delegate negotiate. The negotiation process is described in more detail with respect to FIG. 23. When the negotiation is completed, the process continues to block 2295. At block 2295, the process once again queries whether the final answer is affirmative or negative. If the final answer is affirmative, the process returns to block 2280. If the final answer is negative, the process returns to block 2285.

Figure 23:
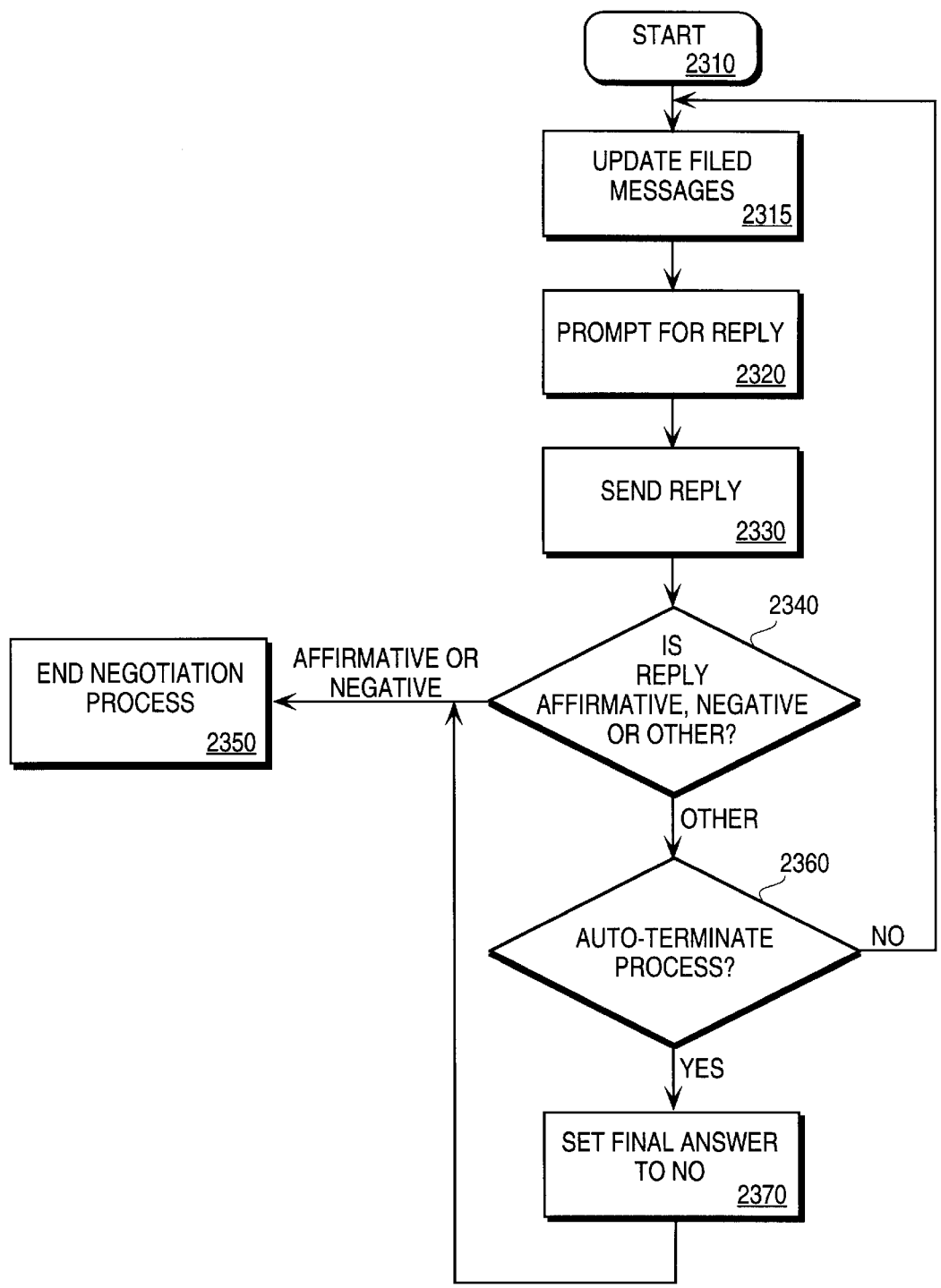
FIG. 23 is a flowchart illustrating the negotiation process of the present invention.

FIG. 23 is an illustration of the negotiation process. The negotiation is initiated at block 2240 and 2290, as described above. If the requester and delegate do not come to an agreement during the initial exchange of messages, they segue into the negotiation process.

At block 2310, the negotiation process starts. At block 2320, the recipient of the last message is prompted for a reply. The negotiation process is entered when the delegate returns a reply which is either a "Yes, if" or a "Comment," or any other reply which is not affirmative or negative.

Thus, in the first iteration, at block 2320, the requester is prompted for a reply, in response to the delegate's initial reply. The reply form that appears before the requester is very similar to the reply form for the delegate. In one embodiment, the categories that may be selected are: OK, OK If, No, Withdraw/Done, and Comment. These categories parallel the categories of Yes, Yes If, No, Done and Comment. The category names may be changed without affecting the present process. The OK reply means that the requester accepts the change or comment proposed by the delegate. An OK If reply is a counterproposal by the requester. A No is a rejection of the delegate's proposal. A Withdraw is notification of the delegate that the original action request is being canceled, and the delegate no longer has to do anything in connection with the action request. An OK is classified as affirmative. A No or Withdraw is classified as a negative. And OK If and Comment are classified as Other. In an alternative embodiment, the reply form does not contain any categories. In that embodiment, the user enters a free-form reply. A parser is used to parse the reply, and determine the reply choice into which it belongs.

As described above, with respect to blocks 2270 and 2320, based on the reply choice selected, a preformatted reply appears, along with the appropriate header information. This simplifies the negotiation process. At block 2330, the reply is sent and a copy of the reply is placed in the appropriate calendars and project/contact lists. The message is also appropriately updated in light of the reply just sent.

At block 2340, the process tests whether the reply just sent was an affirmative, negative or other. As described in the above classification, a delegate's Yes, Done, and a requester's OK are classified as an affirmative. The delegate's No, and the requester's No or Withdraw is classified as a negative. All other answers, i.e. Yes If, OK If, and Comment, are classified as other. Either an affirmative or a negative answer is a final answer. That is, it is a conclusion to the negotiation. If the answer was either affirmative or negative, the process continues to block 2350. At block 2350, the negotiation process terminates.

If, at block 2340, the answer was found to be Other, the process continues to block 2360 At block 2360, the process tests whether there is an auto-terminate that is activated. In one embodiment, the auto-terminate is an option which a requester can select. The auto-terminate automatically ends the negotiation process after a preset number of exchanges. In one embodiment, the user enters the number of exchanges after which the negotiation ends. For example, if the parties can not agree after five e-mail exchanges, the process automatically terminates. This is a method to avoid endless cycles of negotiation when it is apparent that the parties can not agree.

If the auto-termination process is not activated, the process returns to block 2320, and prompts the recipient of the last message for a reply. For example, if the last message was written by the requester to the delegate, the process prompts the delegate to respond to the message.

If, on the other hand, the auto-termination process is activated, at block 2360, the process continues to block 2370. At block 2370, the final answer is set to a No. This indicates that no agreement was reached between the requester and the delegate. The process then continues to block 2350, where the negotiation process terminates.

Figure 24:
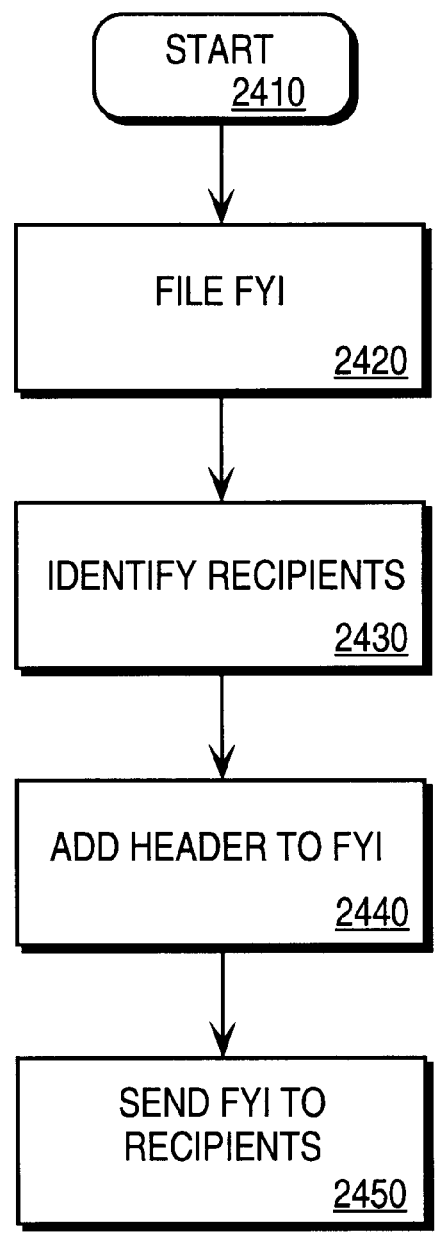
FIG. 24 is a flowchart illustrating the distribution of an FYI note.

FIG. 24 is a flowchart illustrating the distribution of an FYI. As discussed above, an FYI is sent out by an originator to at least one recipient. In one embodiment, an action request may be also sent as an FYI to other users. The FYI does not require a reply. In one embodiment, an FYI recipients may answer.

At block 2410, the process starts. This occurs when a user enters information started with a keyword which indicates that the data entered is an FYI. The FYI is parsed, as described above. At block 2420, the FYI is filed in the system of the originator.

At block 2430, the recipient or recipients are identified. In one embodiment, the name, names, or group names which appear next to the keyword indicating that this is an FYI are identified as the recipient(s). At block 2440, headers are added to the FYI. The header contains the To: field, From: field, cc: field, enclosures: field, and a subject field. These header entries are as described above with respect to the action request.

At block 2450, the FYI is sent to the recipients. When the recipients receive the FYI, they can open it and file it. In one embodiment, no option to distributed reply is provided. In this way, no extraneous communication about information is encouraged.

Figure 25A:
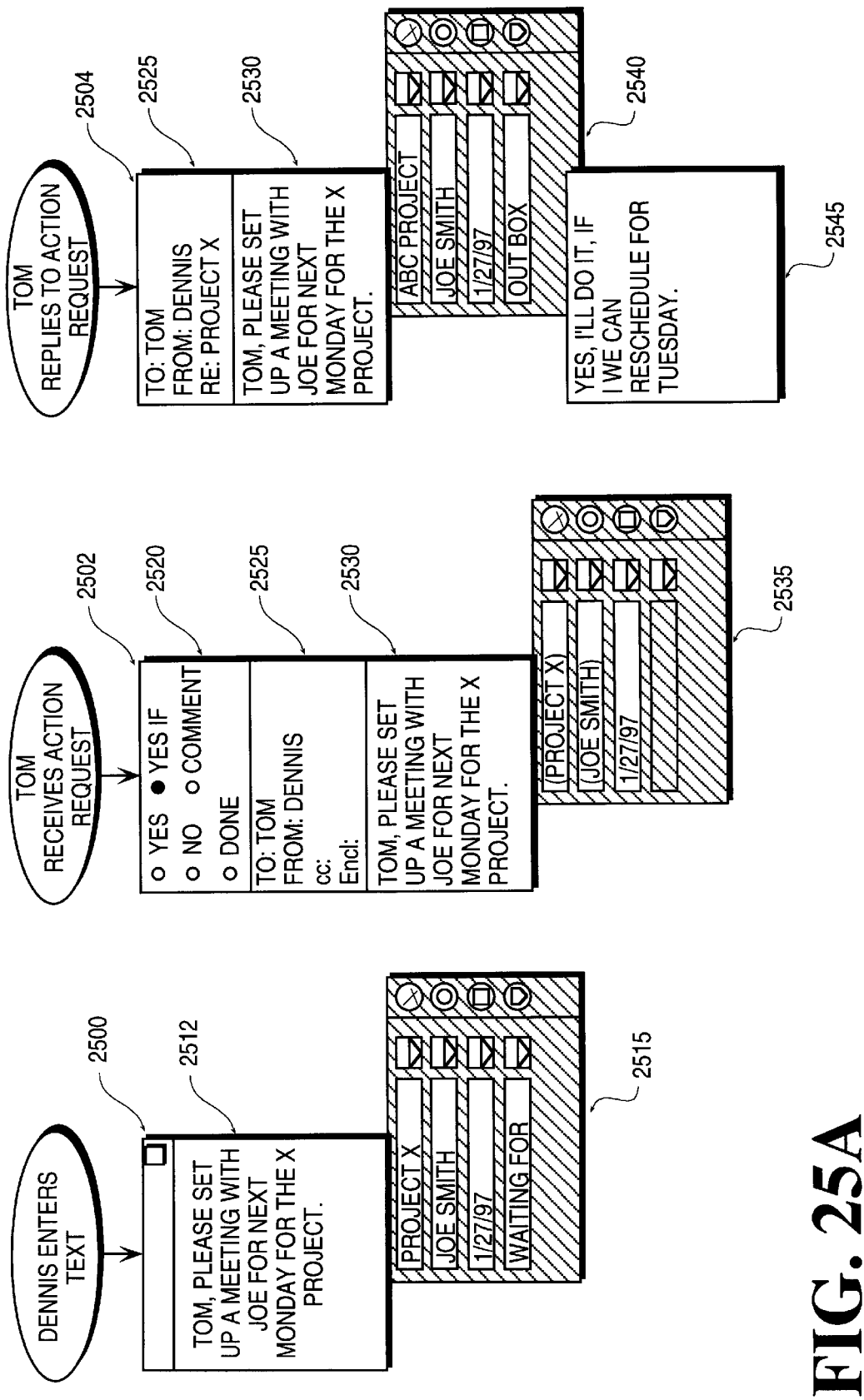
FIGS. 25A and 25B illustrate a graphical an example of the collaborative process.
Figure 25B:
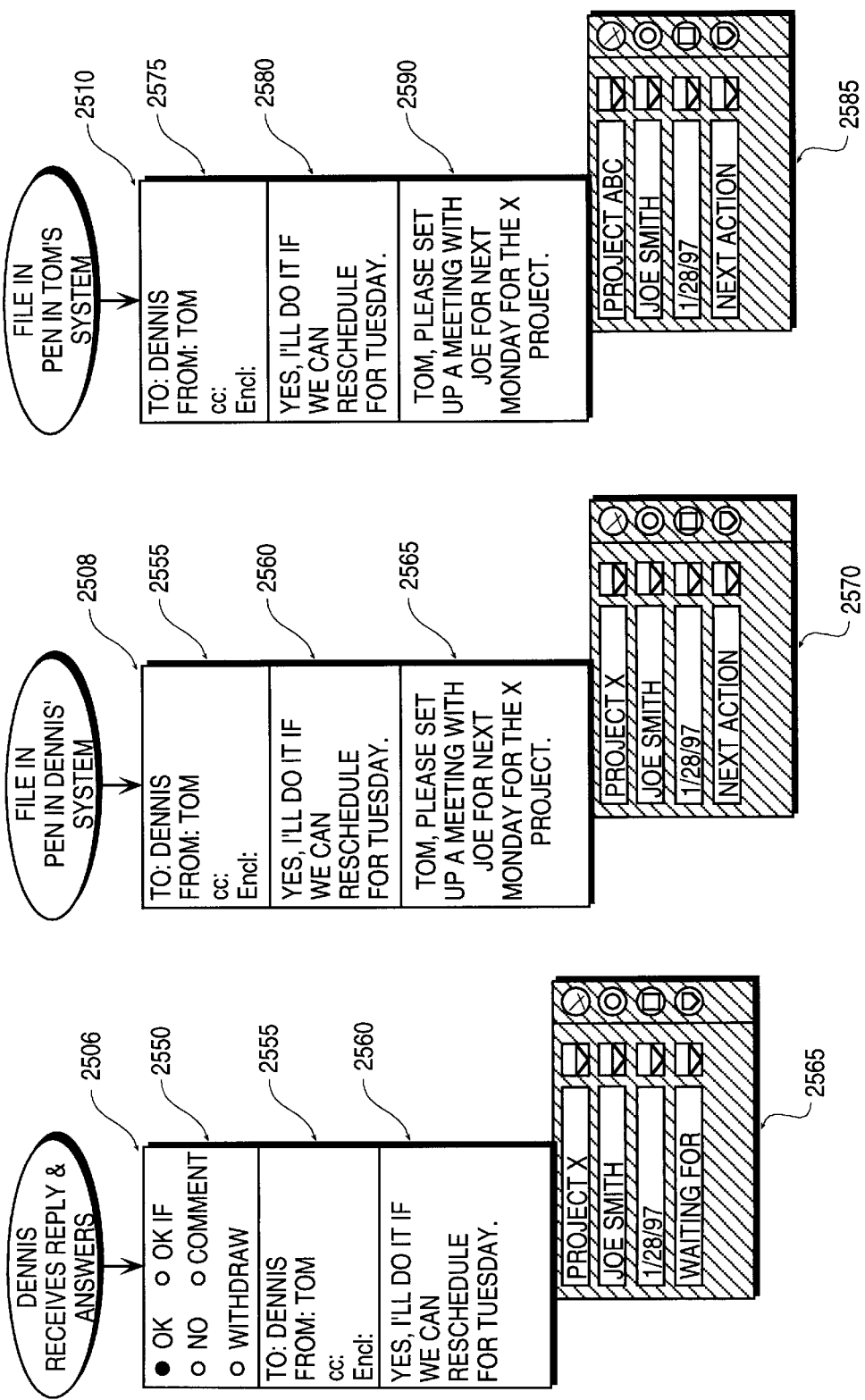

FIGS. 25A and 25B are a flowchart illustrating an example of the collaborative process. In this example, two people, Tom and Dennis are trying to set up a meeting about a certain project. Dennis is the requester, or originator.

At graphic 2500, Dennis is entering text. As described above, the text is being concurrently parsed. Thus, the project, contact, date and appropriate project/contact list come up in the shadow 2515, as Dennis types in the action request 2512. As discussed above, the parsing algorithm may be the algorithm described above, or any other algorithm. In one embodiment, as Dennis is entering the action request 2512, the parser is parsing the text. When the keyword indicating that this is an action request is found, a header is placed on the action request. The spaces in the header, such as delegate, FYI, enclosures etc. are added as they are determined by the parsing algorithm and Dennis' actions. In an alternative embodiment, the action request 2512 is parsed only when Dennis indicates that he has finished entering text. When Dennis finishes entering the action request, he sends it.

At graphic 2502, Tom has received the action request, and opened it. The header 2425 that was automatically generated is displayed. Underneath, the original action request 2530 is displayed. Above the header, a reply block 2520 is displayed. The reply block 2520 displays the possible reply options. In one embodiment, the reply block 2520 is a drop-down list from which one reply may be selected. In another embodiment, the reply block 2520 may be in any other format which allows the user to select a reply. In this instance, the Yes If reply has been highlighted. For contact and project information, suggestions derived from the sender are provided to the recipient initially. In one embodiment, the project name and contact name are in parentheses. This is to indicate that the project and contact names may not be the same for Tom as they were for Dennis. As described above, the keywords vary, because each user can enter his or her own keywords.

At graphic 2504, Tom has selected the Yes If reply button from the reply block 2520, and the reply 2545 is displayed. In one embodiment, reply automatically starts with a "Yes, I'll do it, if . . . " The cursor is placed behind that phrase, enabling Tom to complete the phrase. In this instance, Tom has completed the phrase by typing "we can reschedule for Tuesday." The text entered by Tom is differentiated by being placed in italics in this instance. It is understood that in the actual application, the text need not be differentiated in this way. In the shadow 2540, the project name has been altered. This may be done manually by the user. Alternatively, the process may parse the original note, using Tom's databases and keyword lists. In this instance, the contact name remained the same. However, the project name was changed. Each user is responsible for naming his or her own projects, since two users may refer to the same project by different names. At this point, Tom may send the reply. At that point, a header is placed on the reply, and it is sent back to the requester, i.e., Dennis.

At graphic 2506, Dennis has received Tom's reply and opened it. In the shadow 2560, the new date appears. Tom suggested a new date for the meeting. Because the reply was reparsed for this factor, the new date/time appears in the shadow 2560. Once again, a reply box 2550 appears. Because Dennis is the requester, a slightly different reply box 2550 appears. The entries are explained above, with respect to FIG. 22B. In this instance, Dennis selected the Yes button, agreeing to Tom's suggested date change. In one embodiment, after Dennis selects the Yes button, the reply is automatically sent by the system, and the user's involvement ends. A final answer has been reached. Thus, the negotiation terminates.

At graphic 2508, Dennis' system files the finalized information. In one embodiment, the finalized information is displayed in a box showing the history of the communications between the parties. The original shadow 2515 is updated to an updated shadow 2570. The original penciled entries in Dennis' calendars and lists are also updated to be in ink. This indicates that an agreement was reached.

At graphic 2510, Tom's system files the finalized information. Additionally, the original shadow 2535 is updated to a new shadow 2585, containing the finally agreed upon information. The original penciled entries in Brian's calendars and lists are also updated to be in ink. This indicates that an agreement was reached.

Thus, through this process, one instance of the present invention has been illustrated in a graphical form. It is understood that the actual screen displays may not be identical to the displays illustrated in this Figure. In this way, the interaction between a requester and a delegate is simplified. This allows a delegate and a requester to arrive at a mutually satisfactory way to complete actions/projects. It provides sufficient flexibility for both parties, and works as an automated conversation type of automated negotiation.

Parser DLL Application Programmer's Interface (API)

The following section describes in detail the parser 300 DLL application
25 programmer's interface (API) in the preferred embodiment of the present
invention.
/****************************************************************
   FILE:    parseapi.h PURPOSE: Defines the parse 300 DLL API NOTES: All functions in this API are prefixed with "Prs_" (short for Parse) as a form of namespace protection.

The functions that involve string manipulation are fairly intelligent in terms of filtering the strings. As an example, Prs_AddContact("Danny Rabbani") is equivalent to Prs_AddContact("   Danny Rabbani   ") - capitalization is important here. Prs_DeleteContact("Danny Rabbani") is equivalent to Prs_DeleteContact("   danny raBBanI   "). Prs_AddContact("Danny Rabbani") is not equivalent to Prs_AddContact("   danny rabbani"), because the parser 300 will internally represent the contacts as "Danny Rabbani" and "danny rabbani" respectively. However, the second call will fail because the parser 300 will not allow two contacts (or lists, projects, or keywords) that differ only by capitalization to exist simultaneously. This sort of smart filtering (removing leading and trailing spaces, and ignoring case where applicable), and other forms of error and sanity checking are applied appropriately to most of the functions in this DLL (the autofill functions will only tolerate case differences - white space makes a difference!). However, it is recomended that the client does not rely heavily on such functionalities without at least testing some of them a priori.
*******************************************************************
/

```
#ifndef PARSEAPI_H
define PARSEAPI_H extern "C" {

/*
    Note that a buffer size of 128 allows strings of up to 63 characters in length
when communicating with Visual Basic (VB). This is because VB always
uses Unicode characters which effectively doubles the amount of bytes
needed to store an ascii character. The conversion to Unicode is handled
automatically by VB.
*/
#define PRS_BUFFER_SIZE  128

// Units
#define PRS_DAYS    1
#define PRS_WEEKS   2
```

```
    #define PRS_MONTHS  3
    #define PRS_YEARS   4

// Weekdays
 5  #define PRS_SUN 1
    #define PRS_MON 2
    #define PRS_TUE 4
    #define PRS_WED 8
    #define PRS_THU 16
10  #define PRS_FRI 32
    #define PRS_SAT 64 define PRS_WEEKDAYS    (PRS_MON + PRS_TUE + PRS_WED +
    PRS_THU + PRS_FRI)
15  #define PRS_WEEKENDS    (PRS_SAT + PRS_SUN)

/*------------------------------------------------

20  STRUCT:   ParseOutput

PURPOSE:  The ParseOutput struct is designed to be created and used by
              a client of the parser 300 DLL. The ParseOutput struct is passed as
              a second parameter to the Prs_Parse() function along with an
25            input expression (the first parameter). When the client calls
              Prs_Parse(), the parser 300 analyzes the input expression
              and packages the results of the parsing into the ParseOutput
              struct. There is no need to initialize any of the ParseOutput
              fields prior to calling Prs_Parse(). The Prs_Parse() function
30            will fill out only those fields which were successfully parsed
              out of the expression, and will initialize all other fields to
              null-terminated strings of zero length, or to appropriate null
              values otherwise. If only date parsing is desired, the client
              should call Prs_DateParse() instead of Prs_Parse().
35            Prs_DateParse() works like Prs_Parse() but only the date and
              time related fields of the ParseOutput struct are filled in
              (keyword parsing and delegate parsing are bypassed).
              Both function calls are extremely efficient. Even long and
              complex input expressions (within reason) are parsed in a small
40            fraction of a second.

FIELDS:   sList:    The name of the list as a null-terminated string.

45            sProject: The project name as a null-terminated string
``` sContact: The name of the contact as a null-terminated string.
An example is a First name followed by a single
space followed by a last name.

sDelegate: The name of the contact to delegate to.

sDate: The date as a null-terminated string.
month/day/year format. Example: "12/28/1969"
This field also serves as the starting date for
a recurring event.

sTimeBegin: The start time as a null-terminated string.
[H]H:M[M] 24-hour format. That is, the number of
hours (0 - 23), followed by a colon, followed by
the number of minutes (0 - 59).
Examples: "3:0" = 3:00am, "23:45" = 11:45pm.

sTimeEnd: The end time as a null-terminated string.
Format same as sTimeBegin.

sDateEnd: The ending date of a recurring event.

bRecurring: BYTE size value that serves as a boolean flag to
indicate that the parser 300 found a recurring
event (rather than a simple date). A value of 0
(FALSE) indicates that a recurring date is not
present. All other values represent TRUE (i.e.,
a recurring date was parsed)

nFrequency: Long integer (32 bits) that represents the
frequency of the recurring date. For example,
"every 5 years" has a frequency of 5. Null value
for this field is 0.

nUnits: BYTE size value indicating the units (days, weeks,
months, and years). Defined, respectively, by the
constants: PRS_DAYS, PRS_WEEKS, PRS_MONTHS, and
PRS_YEARS. Null value for this field is 0.

nWeekdays: BYTE size value indicating the day(s) of the
week (i.e., Tuesday, Monday and Friday, etc...).
The weekday constants (PRS_SUN - PRS_SAT) are
defined in such a way as to allow this BYTE field
to encode any combination of up to 7 weekdays.
To find out if a particular weekday is included
in an nWeekdays value, simply "and" (bitwise and operation) the value of the weekday with the
nWeekdays value (e.g., PRS_MON & nWeekdays). Null
value for this field is 0.

nWeekdayPos:BYTE size value indicating the ordinal (1st, 2nd,
3rd, 4th, 5th) position of the weekday within a
month. For example, "The third Tuesday of every
month" would have an nWeekdayPos value of 3. Null
value for this field is 0.

bFYI:    Indicates that the sDelegate field represents an
FYI keynote, rather than a delegate or action request keynote.

bNote:   Indicates that this is a note type of keynote.

————————————————————————————————————*/
```
typedef struct _ParseOutput {
    char sList[PRS_BUFFER_SIZE];
    char sProject[PRS_BUFFER_SIZE];
    char sContact[PRS_BUFFER_SIZE];
    char sDelegate[PRS_BUFFER_SIZE];
    char sDate[PRS_BUFFER_SIZE];
    char sTimeBegin[PRS_BUFFER_SIZE];
    char sTimeEnd[PRS_BUFFER_SIZE];
    char sDateEnd[PRS_BUFFER_SIZE];
    BYTE bRecurring;
    BYTE nUnits;
    BYTE nWeekdays;
    BYTE nWeekdayPos;
    long nFrequency;
    BYTE bFYI;
    BYTE bNote;
} ParseOutput, *ParseOutputPtr;
```

/*————————————————————————————————————

STRUCT:   KeywordSuggestion

PURPOSE:  The KeywordSuggestion struct is designed to be created and
used by a client of the parse DLL. The KeywordSuggestion data
structure is passed as a second parameter to the
Prs_SuggestKeywords() family of functions, along with an input
expression (first parameter). When the client calls
Prs_SuggestListKeywords() for example, the parser 300 analyzes the
input expression (the name of the list in this case), and packages up to three keyword suggestions into the KeywordSuggestion data
structure. There is no need to initialize any of the
KeywordSuggestion fields prior to calling the keyword suggestion
functions. The functions will fill out as many fields as possible (in
consecutive order, starting from sKeyword1), with all other fields
initialized to null-terminated strings of length zero.

FIELDS:  sKeyword1:  The first keyword suggestion as a null-terminated
string.

sKeyword2:  The second keyword suggestion.

sKeyword3:  The third keyword suggestion.

----------------------------------------*/
```
typedef struct _KeywordSuggestion {
    char sKeyword1[PRS_BUFFER_SIZE];
    char sKeyword2[PRS_BUFFER_SIZE];
    char sKeyword3[PRS_BUFFER_SIZE];
} KeywordSuggestion, *KeywordSuggestionPtr;
```

/*----------------------------------------

FUNCTION:  Prs_ResetParseDll

PURPOSE:  The Prs_ResetParseDll() function resets the parsedll. All of
the information which was presented to the DLL via the Add /
Delete functions will be lost. Date parsing will remain fully
functional.
----------------------------------------*/
```
void WINAPI EXPORT Prs_ResetParseDll(void);
```

/*----------------------------------------

FUNCTION:  Prs_Parse

PURPOSE:  The Prs_Parse() function parses an input expression for a list,
project, contact, delegate, and a date/time combination. The 1st
parameter is a pointer to a null-terminated string that holds the
input expression to be parsed. The second parameter is a pointer to a
client-allocated ParseOutput data structure that gets filled out with
the results of the parsing. There is no need for any special
initialization of the ParseOutput data structure other than allocation
of memory. The fields of the ParseOutput data structure that cannot be successfully derived from the input expression will be set to
appropriate null values.

EXAMPLE:   ParseOutput parseResults;
     Prs_Parse("Call Brian tomorrow at 6pm", &parseResults);
―――――――――――――――――――――――――――*/
void WINAPI EXPORT Prs_Parse(const char FAR* sInputExpr, ParseOutput
FAR* pParseOutput);

/*―――――――――――――――――――――――――――――――――

FUNCTION:   Prs_DateParse

PURPOSE:   The Prs_DateParse() function parses an input expression for a
     date and a time (or time span) only. The first parameter is a pointer
     to a null-terminated string that holds the input expression to be
     parsed. The second parameter is a pointer to a client-allocated
     ParseOutput struct that is filled in with the results of the parsing.
     There is no need for any special initialization of the ParseOutput
     data structure other than allocation of memory. The fields of the
     ParseOutput data structure that cannot be successfully derived from
     the input expression will be set to appropriate null values.

EXAMPLE:   ParseOutput parseResults;
     Prs_DateParse("Call Tony next Friday", &parseResults);
―――――――――――――――――――――――――――*/
void WINAPI EXPORT Prs_DateParse(const char FAR* sInputExpr,
ParseOutput FAR* pParseOutput);

/*―――――――――――――――――――――――――――――――――

FUNCTIONS: Prs_SuggestListKeywords,
     Prs_SuggestProjectKeywords
     Prs_SuggestContactKeywords PURPOSE:   Suggest up to 3 keywords for the given list, project, or contact
     The parser will not suggest keywords that are already in use.

EXAMPLE:   KeywordSuggestion suggestion;
     Prs_SuggestContactKeywords("Danny Rabbani", &suggestion);
―――――――――――――――――――――――――――*/
void WINAPI EXPORT Prs_SuggestListKeywords(const char FAR* sList,
          KeywordSuggestion FAR* pSuggestion);

77

```
       void WINAPI EXPORT Prs_SuggestProjectKeywords(const char FAR*
       sProject,
                       KeywordSuggestion FAR* pSuggestion);

5     void WINAPI EXPORT Prs_SuggestContactKeywords(const char FAR*
       sContact,
                       KeywordSuggestion FAR* pSuggestion);

10     /*————————————————————————————————————————

FUNCTIONS: Prs_AddKeyword / Prs_DeleteKeyword /
                 Prs_RenameKeyword 15        PURPOSE:  Add / Delete / Rename an keyword.
                 These functions should be called during initialization or
                 whenever the database is updated.

EXAMPLE:  Prs_AddKeyword("na", "Next Actions", "", "");
20               Prs_DeleteKeyword("na");
                 Prs_RenameKeyword("na", "actions");

NOTE:    Prs_AddKeyword will return FALSE if the keyword already
                 exists, if any of the non-empty links do not exist, or if all of the links
25               are empty. The client must make sure to call this function only
                 AFTER the corresponding lists, projects, or contacts have already been
                 added to the parser 300. To rename an keyword, the client can simply
                 call Prs_RenameKeyword(). Capitalization of any kind is ignored.
                 ————————————————————————————————————————*/
30     BOOL WINAPI EXPORT Prs_AddKeyword(const char FAR* sKeyword,
                       const char FAR* sList,
                       const char FAR* sProject,
                       const char FAR* sContact);

35     BOOL WINAPI EXPORT Prs_DeleteKeyword(const char FAR* sKeyword);
       BOOL WINAPI EXPORT Prs_RenameKeyword(const char FAR*
       sOldKeyword, const char FAR* sNewKeyword);

40     /*————————————————————————————————————————

FUNCTIONS: Prs_AddList / Prs_DeleteList / Prs_RenameList

PURPOSE:  Add / Delete / Rename a list.
45               These functions should be called whenever the object database 850 is
                 updated.
```

```
        EXAMPLE:   Prs_AddList("Next Calls");
                Prs_DeleteList("Next Calls");
                Prs_RenameList("Next Calls", "My Next Calls");

NOTE:      Prs_AddList will return FALSE if the list already exists (even
                   if capitalized differently). Prs_DeleteList will return FALSE
                   if the list doesn't exist. If Prs_DeleteList or Prs_RenameList
                   are successful, all of the keywords that are linked to the list
                   will be automatically removed or updated as necessary.
        ─────────────────────────────────────────────────────────*/
        BOOL WINAPI EXPORT Prs_AddList(const char FAR* sList);
        BOOL WINAPI EXPORT Prs_DeleteList(const char FAR* sList);
        BOOL WINAPI EXPORT Prs_RenameList(const char FAR* sOldList, const
        char FAR* sNewList);

/*─────────────────────────────────────────────────────────

FUNCTIONS:  Prs_AddProject / Prs_DeleteProject / Prs_RenameProject

PURPOSE:   Add / Delete / Rename a project.
                These functions should be called whenever the object database 850 is
                updated.

EXAMPLE:   Prs_AddProject("Learn Spanish");
                Prs_DeleteProject("Learn Spanish");
                Prs_RenameProject("Learn Spanish", "Learn French");

NOTE:      See NOTE for Prs_AddList
        ─────────────────────────────────────────────────────────*/
        BOOL WINAPI EXPORT Prs_AddProject(const char FAR* sProject);
        BOOL WINAPI EXPORT Prs_DeleteProject(const char FAR* sProject);
        BOOL WINAPI EXPORT Prs_RenameProject(const char FAR* sOldProject,
        const char FAR* sNewProject);

/*─────────────────────────────────────────────────────────

FUNCTIONS:  Prs_AddContact / Prs_DeleteContact / Prs_RenameContact

PURPOSE:   Add / Delete / Rename a contact
                These functions should be called whenever the object database 850 is
                updated.

EXAMPLE:   Prs_AddContact("Danny Rabbani");
```

```
            Prs_DeleteContact("Danny Rabbani");
            Prs_RenameContact("Danny Rabbani", "Dan Rabbani");

NOTE:   See NOTE for Prs_AddList
5   ─────────────────────────────────────────────── */
    BOOL WINAPI EXPORT Prs_AddContact(const char FAR* sContact);
    BOOL WINAPI EXPORT Prs_DeleteContact(const char FAR* sContact);
    BOOL WINAPI EXPORT Prs_RenameContact(const char FAR* sOldContact,
    const char FAR* sNewContact);
10

/*─────────────*/
    /* AutoFill Functions */
    /*─────────────*/
15
    /*──────────────────────────────────────────────

FUNCTIONS:  Prs_AutoFillList, Prs_AutoFillProject, Prs_AutoFillContact

20      PURPOSE:   Return the completion of the substring.  The functions take a
                   prefix string as a first parameter and fill in the buffer (the
                   second parameter) with the completion of the prefix and return
                   TRUE.  If the completion does not exist, the functions will
                   return FALSE (see NOTE below). The functions are NOT case
25                 sensitive with respect to the prefix string (first parameter).
                   This has the advantage that a prefix such as "d" will expand
                   to "Danny Rabbani" as will a "D" prefix.

NOTE:      If the completion does not exist, the functions will return
30                 FALSE and the buffer (second parameter) is not modified.

EXAMPLE:   Prs_AddProject("Grasshopper");
                   char sProject[PRS_BUFFER_SIZE];
                   Prs_AutoFillProject("gra", sProject);
35                 AfxMessageBox(sProject);   // Outputs "Grasshopper"
    ─────────────────────────────────────────────── */
    BOOL WINAPI EXPORT Prs_AutoFillList(const char FAR* sListPrefix, char
    FAR* sListBuffer);
    BOOL WINAPI EXPORT Prs_AutoFillProject(const char FAR* sProjectPrefix,
40  char FAR* sProjectBuffer);
    BOOL WINAPI EXPORT Prs_AutoFillContact(const char FAR*
    sContactPrefix, char FAR* sContactBuffer);

}
45
    #endif /* PARSEAPI_H */
```

80

Sample Electronic Mail Message

The present invention can be used to receive and parse an input keynote in the manner described above. In addition, the present invention supports collaboration with other users, each of whom may or may not have the functionality of the present invention. Because a receiver of a keynote may not have the functionality of the present invention, the present invention automatically formats a conventional electronic mail message which can be sent to a receiver or delagate of a keynote. Using the parser 300 as described above, the present invention takes an input keynote and builds the conventional electronic mail message from information associated with keywords matched in the input keynote. In addition, the present invention also builds a scripted (i.e., encoded) version of the electronic mail message. The scripted version of the electronic mail message is formatted in a structured form to allow a receiver or delagate of the keynote to process the message automatically if the receiver or delagate has the functionality of the present invention. If the receiver or delagate has the functionality of the present invention, the scripted version of the keynote can be interpreted and automatically processed as a keynote on the receiving end. Thus, the present invention, by building an electronic message with both a conventional text format and a scripted format combined in the same automatically generated electronic message, allows keynote collaboration with anyone on the receiving end of such an electronic mail message.

The following sample automatically generated keynote electronic mail message illustrates the dual format electronic message structure automatically created by the present invention given the following input keynote:

> Jim, please add this sample KeyNote to
> the KeyNote/parser patent tomorrow. Call
> Tom if you have questions. Thanks!

A sample electronic mail message produced by the present invention from the above input keynote follows. The first portion of the message below represents the conventional electronic mail format (ASCII) readable by a receiver without the functionality of the present invention. The second portion of the message starting with the second occurance of the text string, "--dreldbssbtdwrvkval" represents the scripted version of the message which can be processed by a receiver with the functionality of the present invention. Thus, this sample electronic mail message illustrates the dual format electronic mail message generation capability of the present invention. A further explanation of the collaboration capability of the present invention is provided in a later section of this patent application.

```
--begin sample electronic mail message--
This is a multipart message in MIME format.

--dreldbssbtdwrvkval
<other content transfer encoding type being used, probably
quoted-printable or 7-bit>

Jim, please add this sample KeyNote to the KeyNote/parser
patent tomorrow. Call Tom if you have questions. Thanks!

This is an ActionRequest for Jim Salter from Dennis Buchheim.
It relates to:

Project:   Patents
Contact:   Tom Hagan
Due Date:  2/6/97
-------------------------------------------------------------
PROJECT    INFORMATION Name:     Patents
Due:      2/5/97
```

```
    Outcome: Successfully defend Actioneer's inventions.
    ------------------------------------------------------------------
 5  C O N T A C T    I N F O R M A T I O N Tom Hagan
    Chairman
10  Actioneer, Inc.
    539 Bryant St.
    San Francisco, CA 94107
    USA
    (415) 555-1212 (Work)
15  hagan@actioneer.com (Internet)

--dreldbssbtdwrvkval
20  <other content transfer encoding type being used, probably
    quoted-printable or 7-bit>

X-Keynote-Delegate: TRUE
    BEGIN:VCARD
25  X-Version:1.0.0.0.0
    X-Type:ENVELOPE
    X-GUID:1de904e1-7f86-11d0-b001-00c026303ba3
    X-ID:160
    X-GUID:00000000-0000-0000-0000-000000000000
30  X-ID:0
    X-Type:PERSON
    X-GUID:1de904e1-7f86-11d0-b001-00c026303ba3
    X-ID:1
    X-Salutation:
35  N:Buchheim;Dennis
    X-MiddleName:
    X-Type:EMAIL_ADDR
    X-GUID:1de904e1-7f86-11d0-b001-00c026303ba3
    X-ID:2
40  X-EmailAddrType:+//ISBN 1-887687-00-9::versit::PDI//INTERNET
    EMAIL;INTERNET:buchheim
    X-List:1
    X-Type:PERSON
    X-GUID:1de904e1-7f86-11d0-b001-00c026303ba3
45  X-ID:1
    X-Salutation:
    X-FamilyName:Buchheim
    X-GivenName:Dennis
    X-MiddleName:
50  X-Type:EMAIL_ADDR
    X-GUID:1de904e1-7f86-11d0-b001-00c026303ba3
    X-ID:2
    X-EmailAddrType:+//ISBN 1-887687-00-9::versit::PDI//INTERNET
    EMAIL;INTERNET:buchheim
```

```
      X-List:1
      X-Type:EMAIL_ADDR
      X-GUID:1de904e1-7f86-11d0-b001-00c026303ba3
      X-ID:136
 5    X-EmailAddrType:+//ISBN 1-887687-00-9::versit::PDI//INTERNET
      EMAIL;INTERNET:jim_salter@bstz.com
      X-List:3
      X-Type:EMAIL_ADDR
      X-GUID:1de904e1-7f86-11d0-b001-00c026303ba3
10    X-ID:126
      X-EmailAddrType:+//ISBN 1-887687-00-9::versit::PDI//INTERNET
      EMAIL;INTERNET:buchheim@actioneer.com
      X-Type:EMAIL_ADDR
      X-GUID:1de904e1-7f86-11d0-b001-00c026303ba3
15    X-ID:151
      X-EmailAddrType:+//ISBN 1-887687-00-9::versit::PDI//INTERNET
      EMAIL;INTERNET:hagan@actioneer.com
      X-Type:EMAIL_ADDR
      X-GUID:1de904e1-7f86-11d0-b001-00c026303ba3
20    X-ID:143
      X-EmailAddrType:+//ISBN 1-887687-00-9::versit::PDI//INTERNET
      EMAIL;INTERNET:judith_szepesi@bstz.com
      X-Type:LIST_ITEM
      X-GUID:1de904e1-7f86-11d0-b001-00c026303ba3
25    X-ID:157
      X-ItemType:ACTION
      X-Complete:OPEN
      X-Collaboration:REQUESTOUT
      X-Priority:0
30    X-List:1
      X-BodyText:Jim, please add this sample KeyNote to the
      KeyNote/parser patent tomorrow.  Call Tom if you have
      questions.  Thanks!
      X-List:1
35    X-ReplyText:
      X-Date:35466.812778
      X-List:1
      X-Type:PERSON
      X-GUID:1de904e1-7f86-11d0-b001-00c026303ba3
40    X-ID:130
      X-Salutation:
      X-FamilyName:Salter
      X-GivenName:Jim
      X-MiddleName:
45    X-List:1
      X-Type:PROJECT
      X-GUID:1de904e1-7f86-11d0-b001-00c026303ba3
      X-ID:153
      X-ProjName:Patents
50    X-Outcome:Successfully defend Actioneer's inventions.
      X-Type:SIMPLE_DATE
      X-GUID:1de904e1-7f86-11d0-b001-00c026303ba3
      X-ID:156
      X-DateType:REFONLY
```

```
X-SimpleDate:-1,35466.000000,35468.000000,0.000000,0.000000
X-List:1
X-Type:PROJECT
X-GUID:1de904e1-7f86-11d0-b001-00c026303ba3
X-ID:153
X-ProjName:Patents
X-List:1
X-Type:PERSON
X-GUID:1de904e1-7f86-11d0-b001-00c026303ba3
X-ID:144
X-Salutation:
X-FamilyName:Hagan
X-GivenName:Tom
X-MiddleName:
ORG:Actioneer, Inc.;
TITLE:Chairman
X-List:1
X-Type:ADDRESS
X-GUID:1de904e1-7f86-11d0-b001-00c026303ba3
X-ID:152
X-AddrType:+//ISBN 1-887687-00-9::versit::PDI//WORK
ADR:; ;539 Bryant St.;San Francisco;CA;94107;USA
X-List:1
X-Type:PHONE
X-GUID:1de904e1-7f86-11d0-b001-00c026303ba3
X-ID:150
TEL;WORK:(415) 555-1212
X-List:1
X-Type:EMAIL_ADDR
X-GUID:1de904e1-7f86-11d0-b001-00c026303ba3
X-ID:151
X-EmailAddrType:+//ISBN 1-887687-00-9::versit::PDI//INTERNET
EMAIL;INTERNET:hagan@actioneer.com
X-List:1
X-Type:PERSON
X-GUID:1de904e1-7f86-11d0-b001-00c026303ba3
X-ID:144
X-Salutation:
X-FamilyName:Hagan
X-GivenName:Tom
X-MiddleName:
X-Type:SIMPLE_DATE
X-GUID:1de904e1-7f86-11d0-b001-00c026303ba3
X-ID:159
X-DateType:REFONLY
X-SimpleDate:-1,35467.000000,0.000000,0.000000,0.000000
END:VCARD
--dreldbssbtdwrvkval--
--end of sample electronic mail message--
```

Thus, a natural language based information organization and collaboration tool for a computer system is described although the invention has been described with respect to specific examples herein, it will be apparent to those of ordinary skill in the art that the invention is not limited to the use of specific examples but may extend to other embodiments as well. The present invention is intended to include all of these other embodiments as defined in the following claims.

What is claimed is:

1. A method of collaborating on projects, using a first instance of a messaging system and a second instance of the messaging system, the method comprising the computer implemented steps of:

permitting entry of a message in the first instance of the messaging system;

parsing the message to identify a keyword;

linking the message to an information object based on the keyword identified in the message;

creating a header for the message based on the keywords;

sending the message, using the header, to the second instance of the messaging system;

receiving the message at the second instance of the messaging system;

displaying a selection of reply options;

generating a reply including an automatic reply content based on the selection;

creating a reply header for the reply based on the message content; and sending the reply, using the reply header, to the first instance of the messaging system; and entering an entry into a first calendar and a first list based on the message in the first instance of the messaging system;

wherein the selection of reply options include an affirmative, a negative, and an other.

2. The method of claim 1, further comprising:

filing a copy of the message in the first instance of the messaging system.

3. The method of claim 1, further comprising:

filing a copy of the message and the reply in the second instance of the messaging system.

4. The method of claim 1, further comprising:

entering an entry into a second calendar and a second list based on the message, in the second instance of the messaging system.

5. The method of claim 1 wherein said entry is entered in a pencil.

6. The method of claim 4 wherein said entry is entered in a pencil.

7. The method of claim 4, further comprising:

continuing a collaboration when the selection is the other, until the selection is the affirmative or the negative;

completing the collaboration when the reply option is the affirmative; and aborting the collaboration when the reply option is the negative.

8. The method of claim 7, wherein the step of aborting the collaboration comprises:

deleting the entry in the first calendar and the first list in the first instance of the messaging system; and deleting the entry in the second calendar and the second list in the second instance of the messaging system.

9. The method of claim 7 wherein said step of completing the collaboration comprises:

updating the entry in the first calendar and the first list based on the reply from the second instance of the messaging system; and updating the entry in the second calendar and the second list based on the reply.

10. The method of claim 9, wherein said step of updating comprises entering said entry using a pen.

11. The method of claim 10 wherein using the pen indicates using a different color from using the pencil.

12. The method of claim 7 wherein said step of continuing the collaboration comprises continuing a negotiation cycle, the negotiation cycle comprising:

receiving the reply with the reply option of the other;

displaying the selection of the reply options;

generating a new reply, including a new automatic reply content based on the selection;

creating a new header; and sending the new reply, using the new header.

13. The method of claim 12, further comprising the steps of:

determining whether the new reply is the affirmative, the negative, or the other;

executing another negotiation cycle if the reply is the other; and ending the collaboration if the reply is the affirmative or the negative.

14. The method of claim 1, wherein said first instance and said second instance of said messaging system are implemented on a peer-to-peer distributed system.

15. The method of claim 14, wherein said peer-to-peer distributed system comprises using a network to connect a plurality of computer systems.

16. A method of collaborating on projects, the method comprising the computer implemented steps of:

receiving a message from an originator;

parsing the message to identify a keyword indicating an intended recipient for the message;

linking the message to an address of the intended recipient;

sending the message to the intended recipient;

receiving the message at a system of the intended recipient;

displaying a selection of reply options;

generating a reply, including an automatic reply content based on the selection;

sending the reply;

determining if the intended recipient is responding to the originator or sending the message to a third party based on the selection;

sending the reply to the originator if the recipient is responding to the originator;

if the intended recipient is sending the message to a third party:

parsing the message to identify a keyword indicating the third party for the message;

linking the message to an address of the third party;

sending the message to the third party; and entering an entry into a calendar and a list of the originator.

17. The method of claim 16, wherein the selection of reply options include an affirmative, a negative, and an other.

18. The method of claim 17, wherein the selection other includes delegating the message to the third party.

19. The method of claim 17, further comprising:

continuing a collaboration when the selection is the other, until the selection is the affirmative or the negative;

completing the collaboration when the reply option is the affirmative; and aborting the collaboration when the reply option is the negative.

20. The method of claim 19, wherein the step of aborting the collaboration comprises:

deleting an entry in a calendar and a list generated based on the message.

21. The method of claim 19 wherein said step of completing the collaboration comprises:

updating entries in calendars and lists of the originator and the intended recipient based on the reply, such that the originator and the intended recipient have calendar entries and list entries based on the collaboration.

22. The method of claim 19 wherein said step of completing the collaboration comprises:

updating entries in calendars and lists any other parties involved in the collaboration.

23. The method of claim 16, further comprising:

entering an entry into a calendar and a list of the intended recipient.

24. The method of claim 16, further comprising:

modifying the entry in the calendar and the list based on a response from the intended recipient.

* * * * *